Nov. 26, 1957 T. A. FEDERWITZ 2,814,248
DUPLICATING MACHINES
Filed June 24, 1954 30 Sheets-Sheet 1
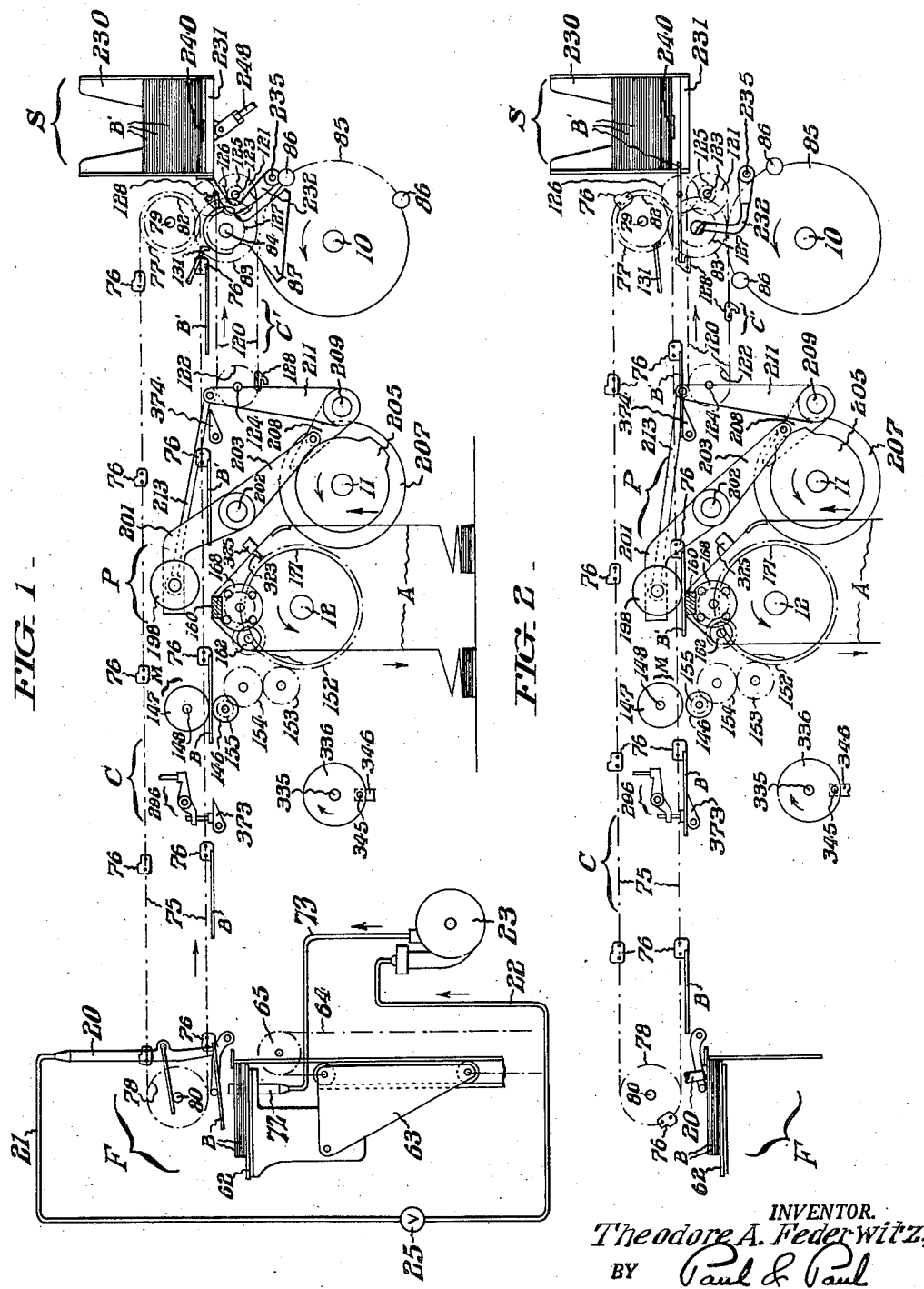
INVENTOR.
Theodore A. Federwitz,
BY Paul & Paul
ATTORNEYS.

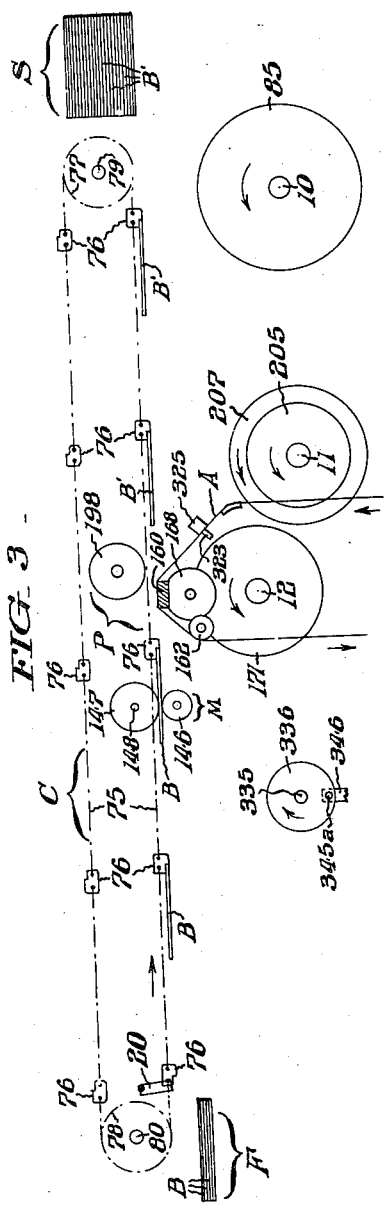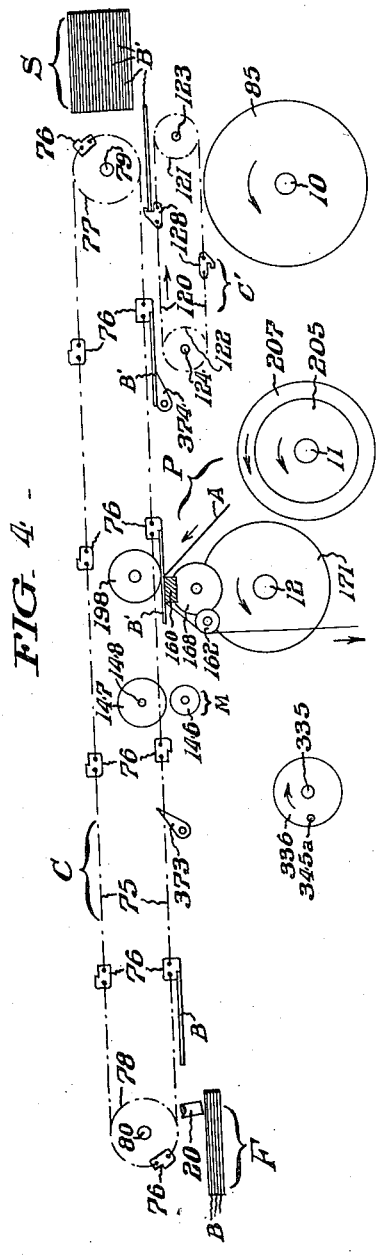

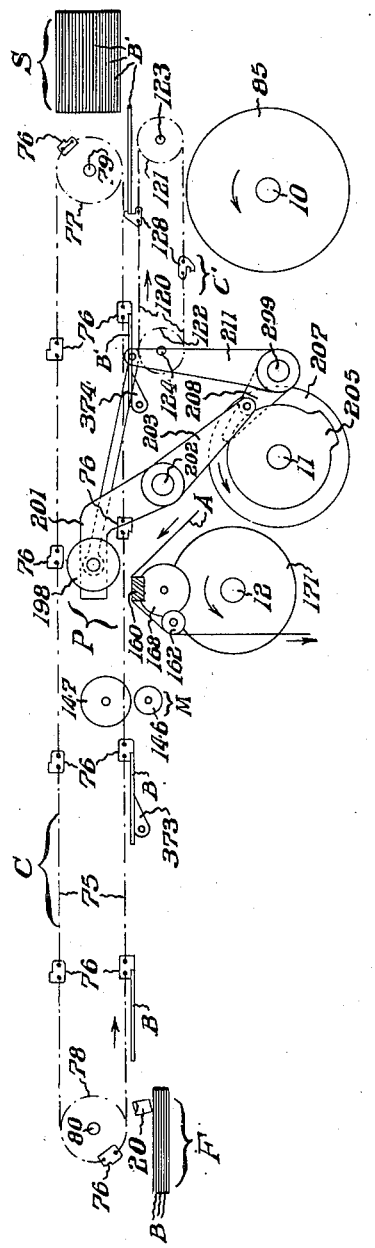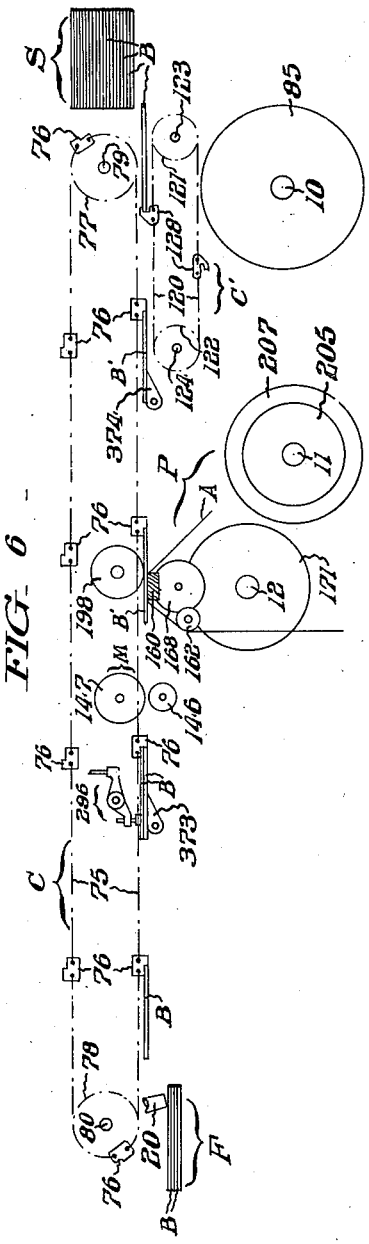

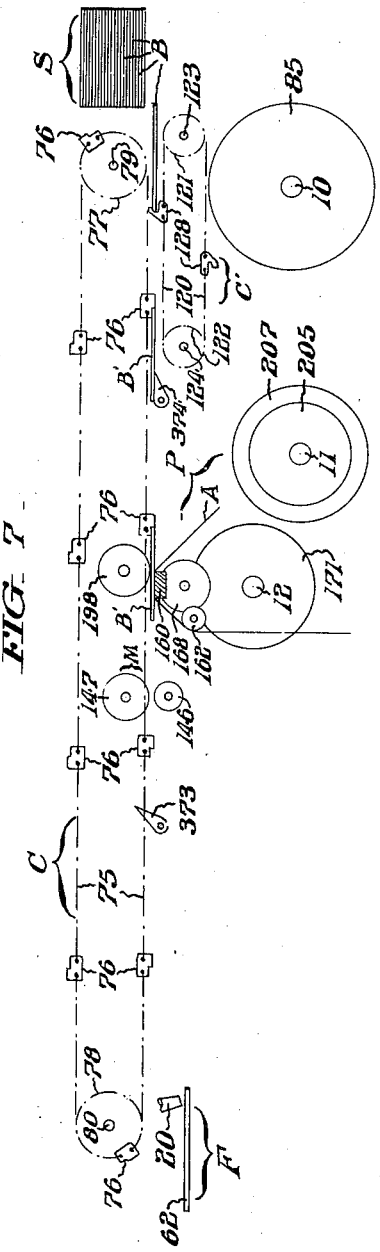
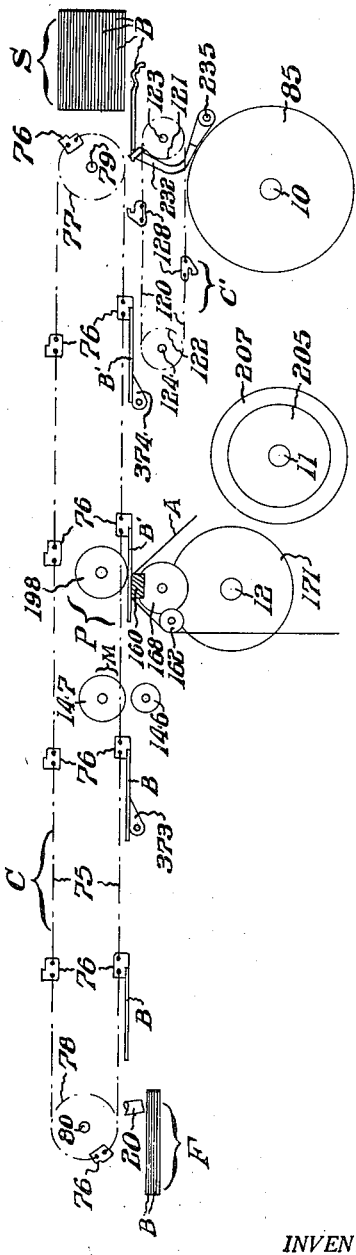

Nov. 26, 1957 T. A. FEDERWITZ 2,814,248
DUPLICATING MACHINES
Filed June 24, 1954 30 Sheets-Sheet 5
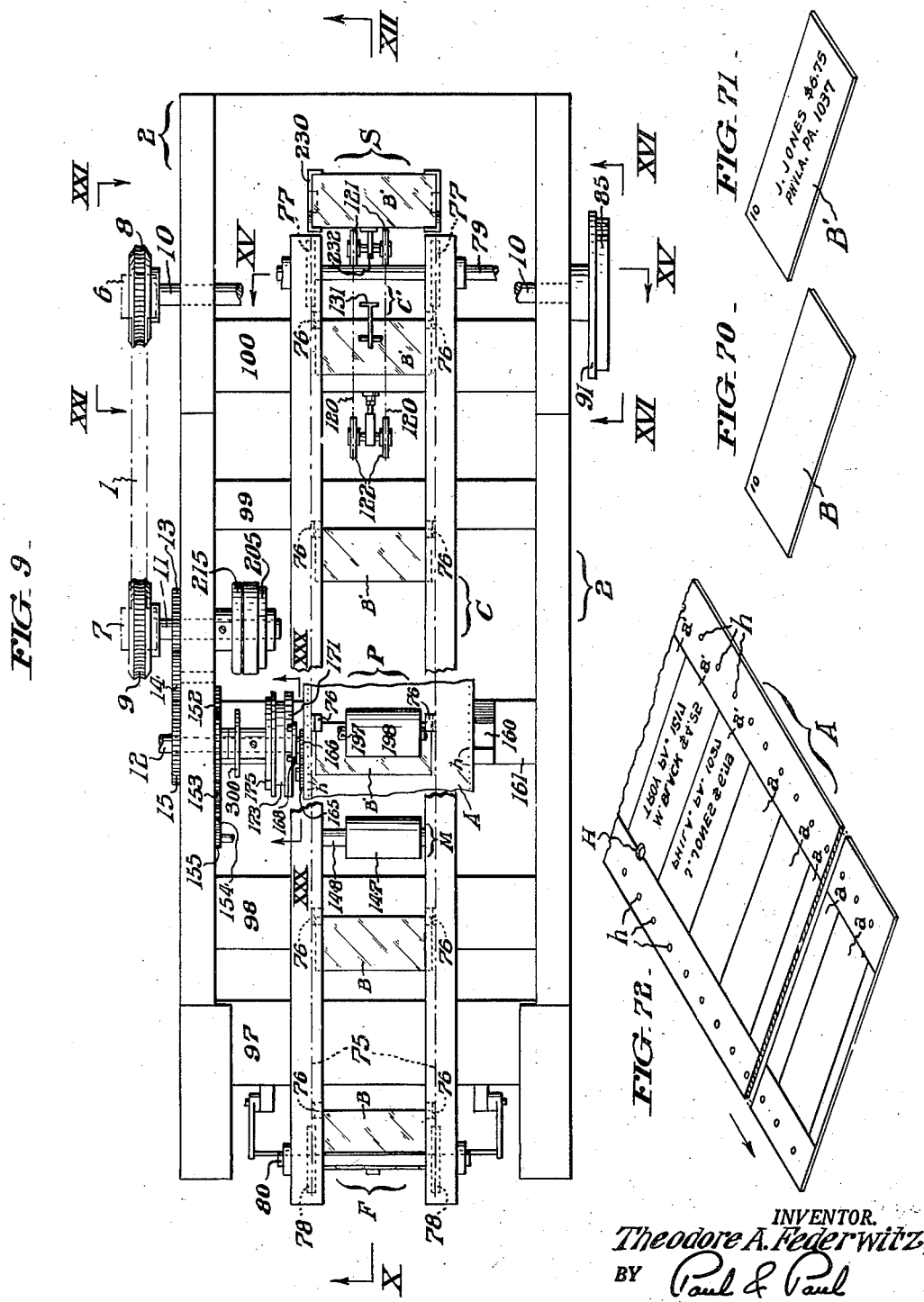
INVENTOR.
*Theodore A. Federwitz,*
BY *Paul & Paul*
ATTORNEYS.

Nov. 26, 1957  T. A. FEDERWITZ  2,814,248
DUPLICATING MACHINES
Filed June 24, 1954  30 Sheets-Sheet 6
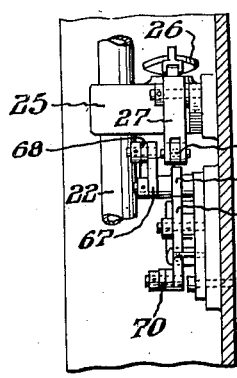
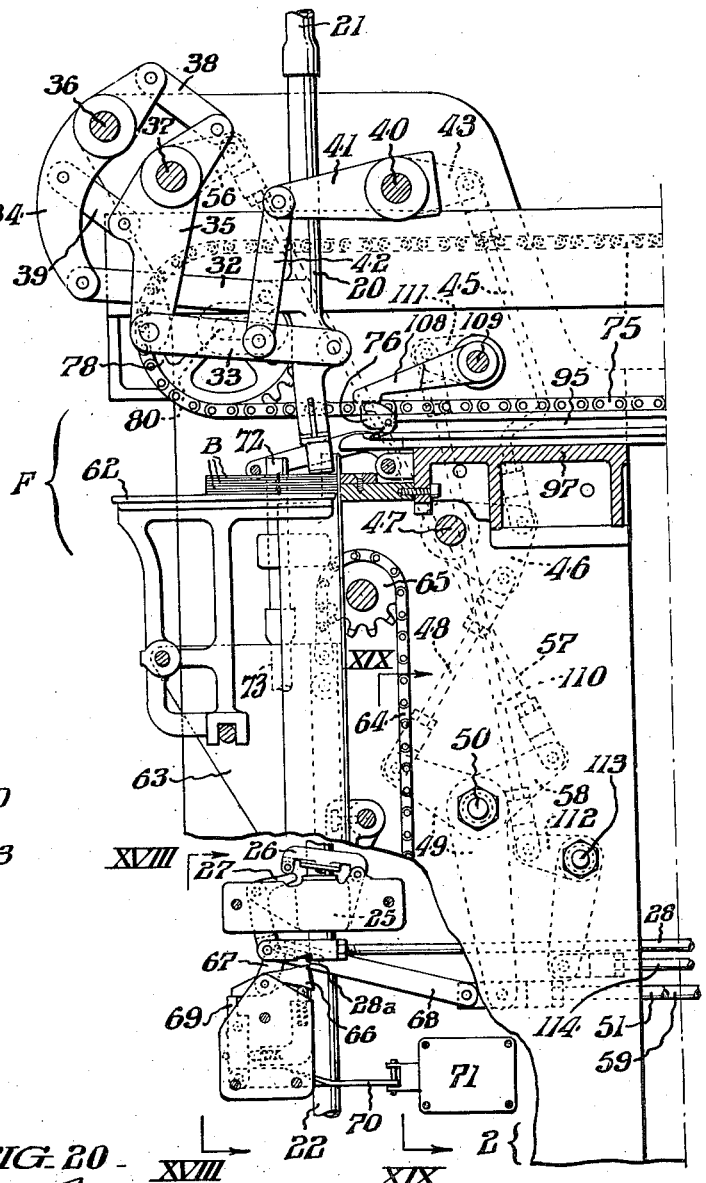
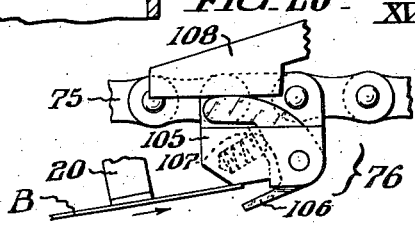
INVENTOR.
Theodore A. Federwitz,
BY Paul & Paul
ATTORNEYS.

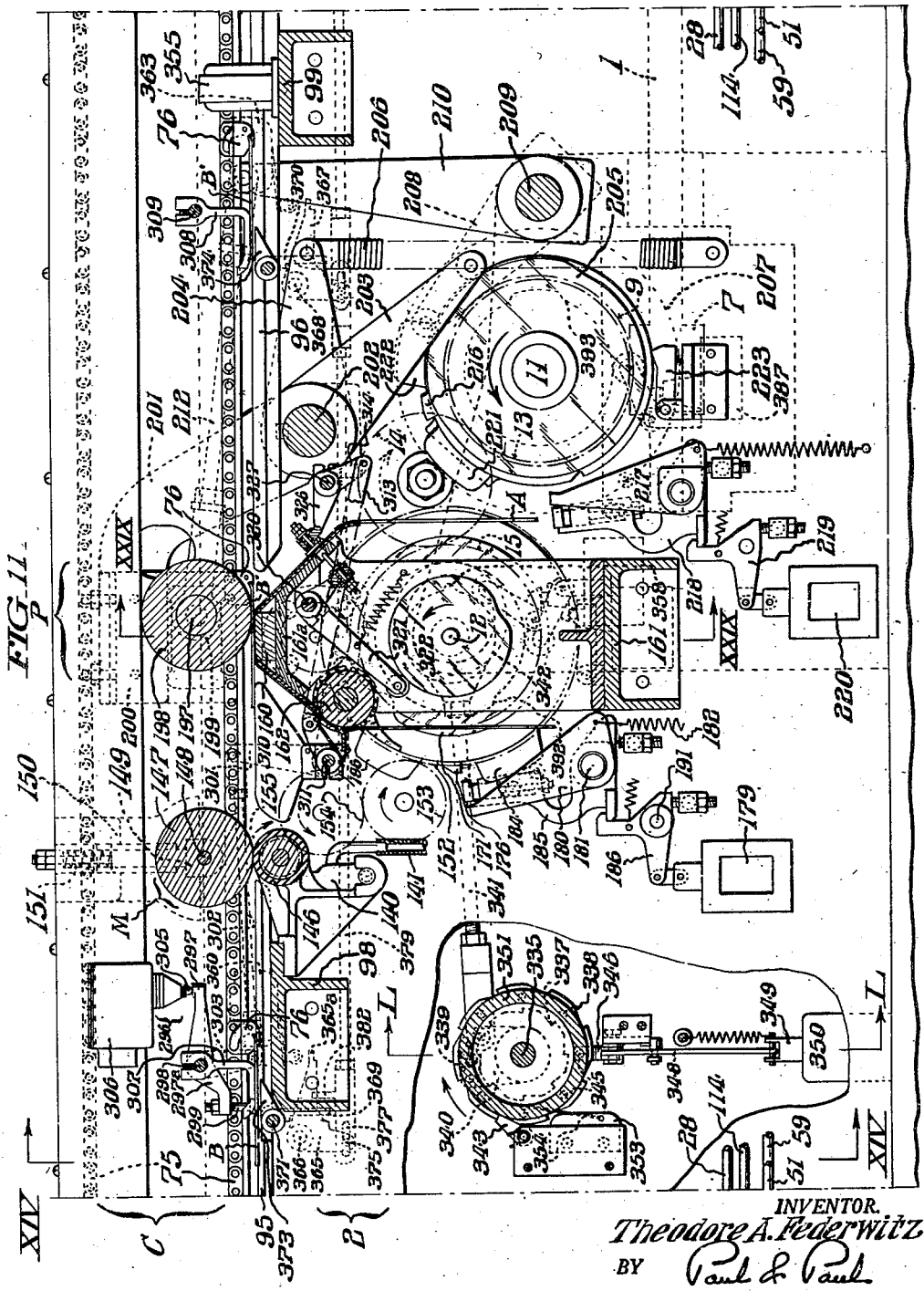

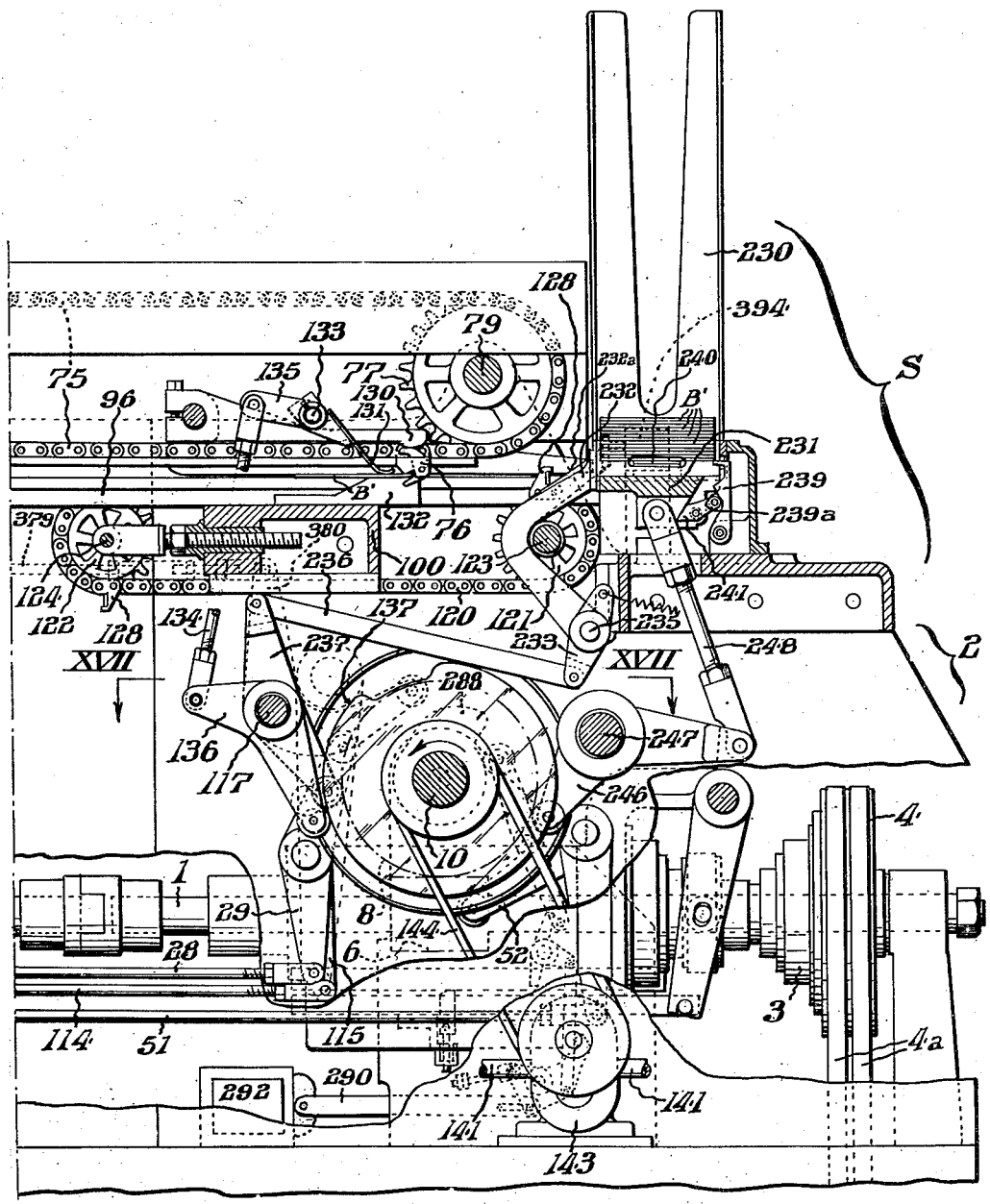

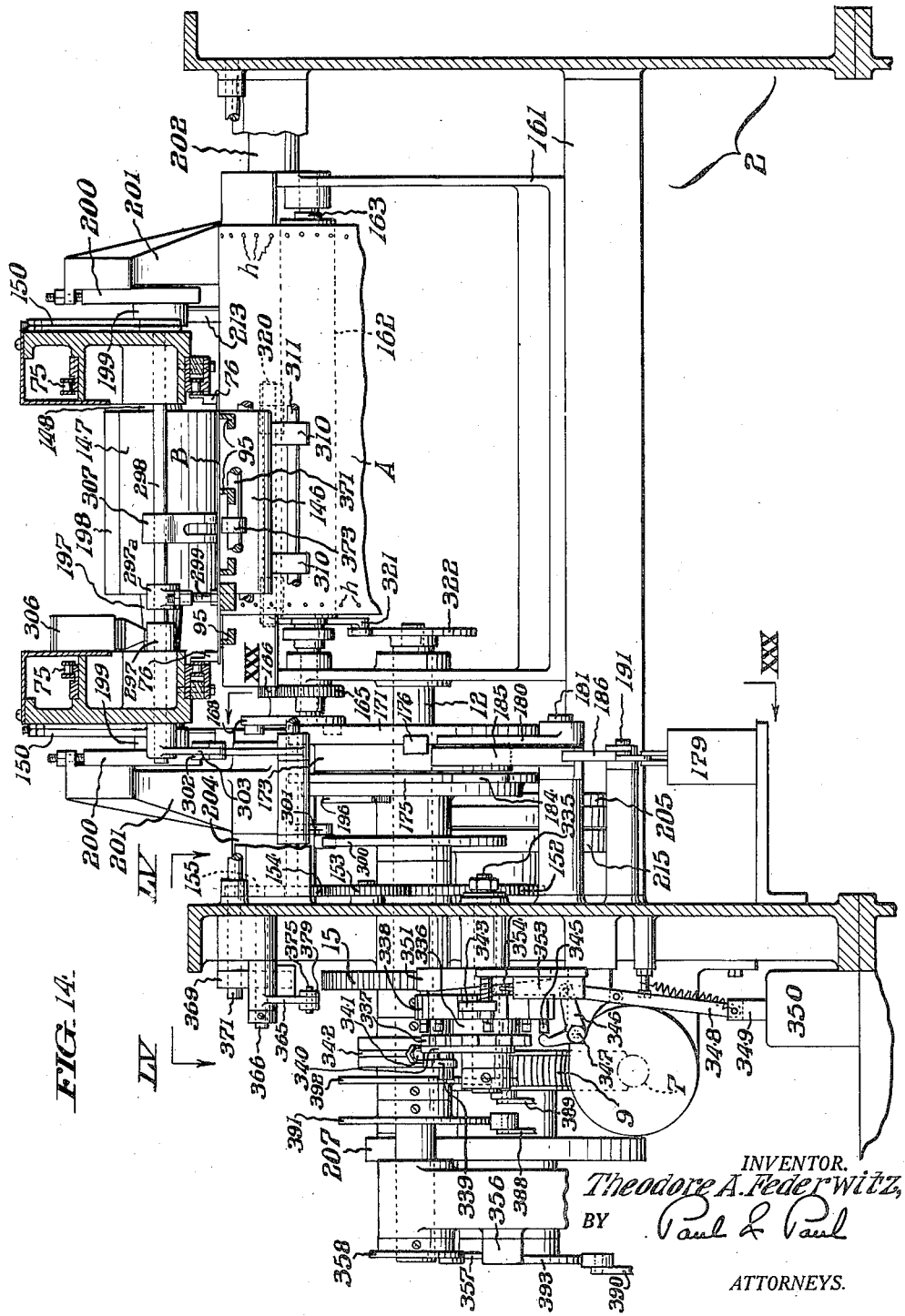

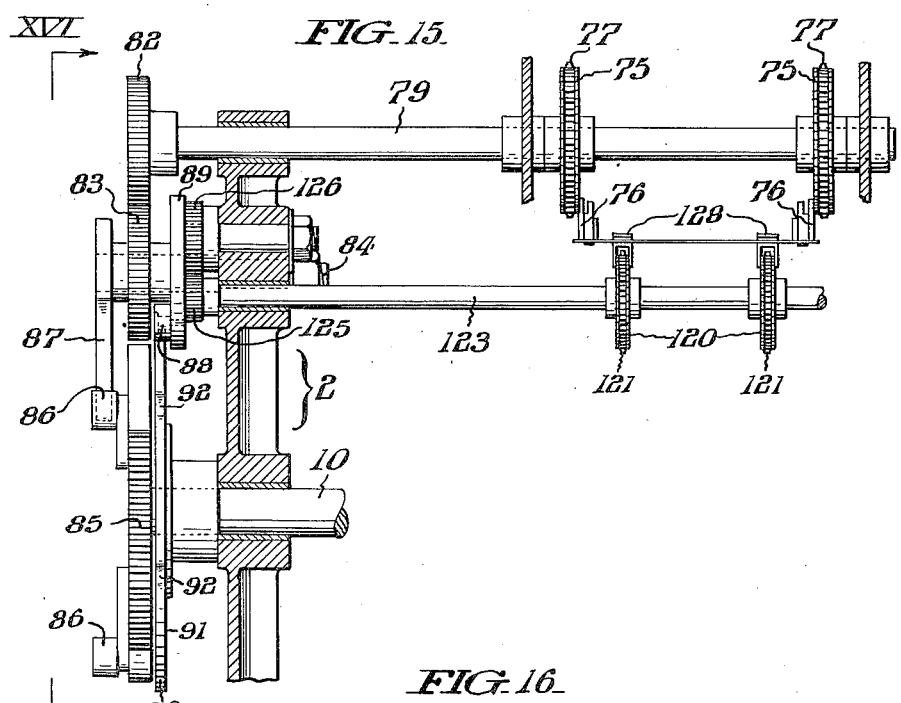
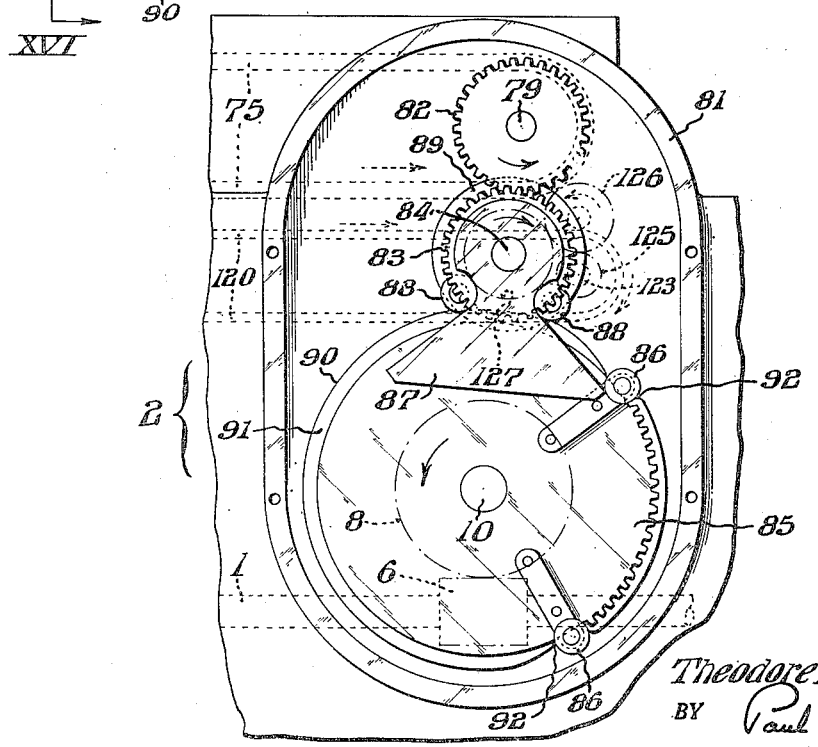

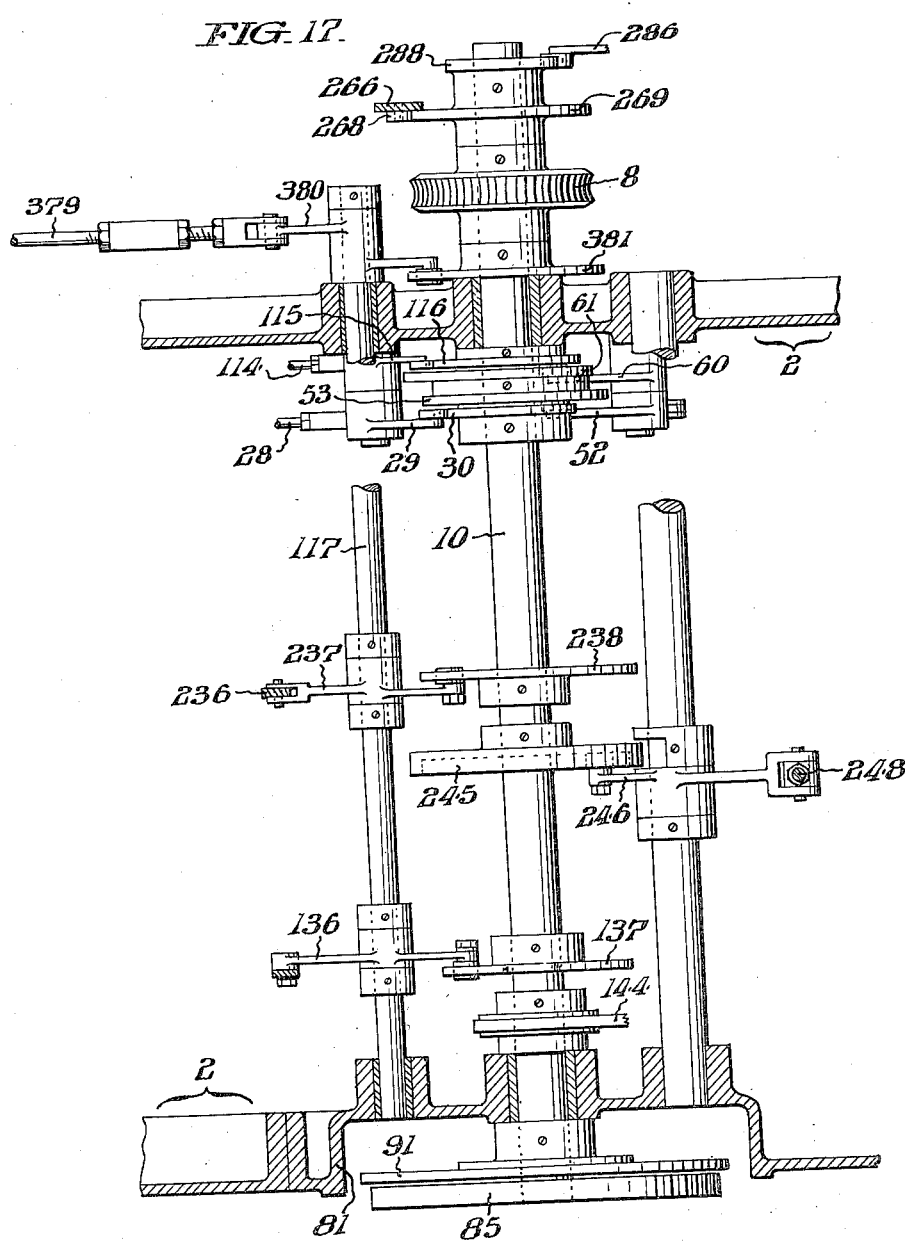

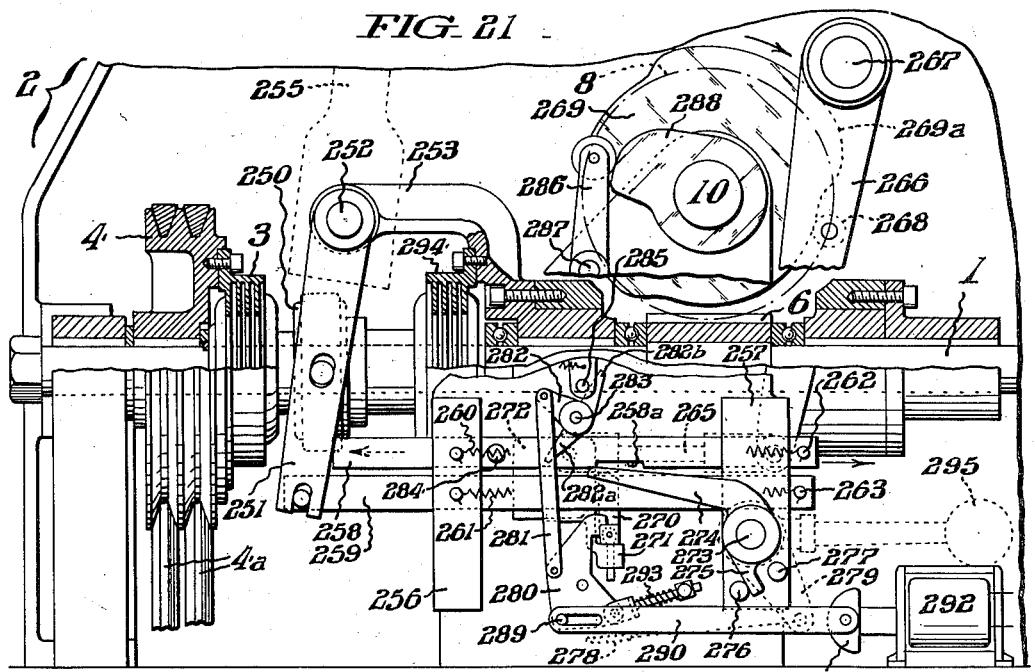
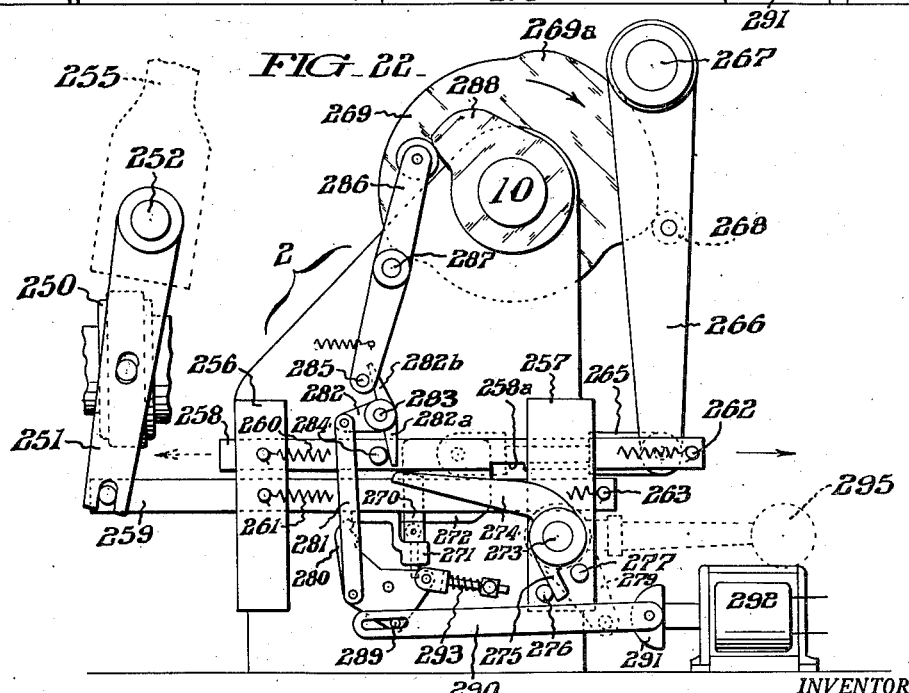

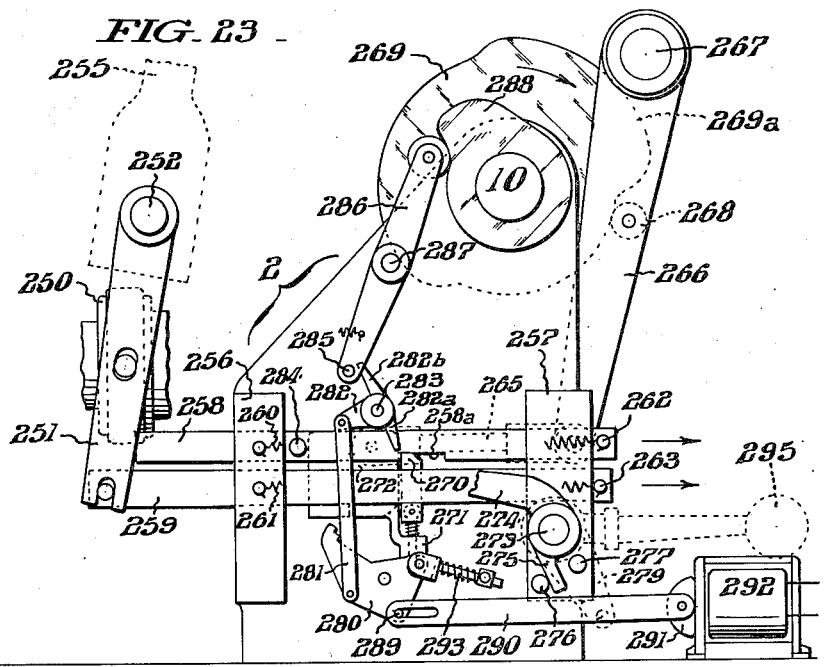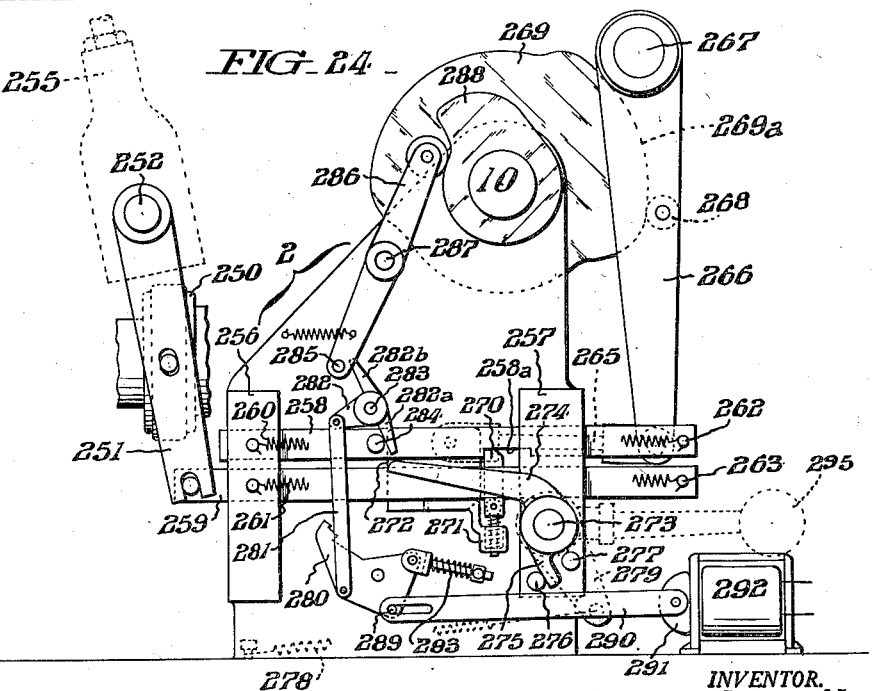

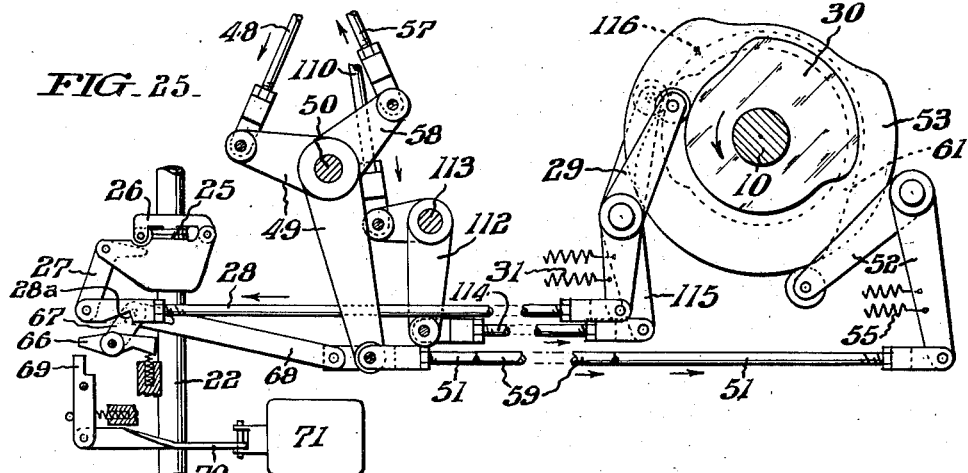
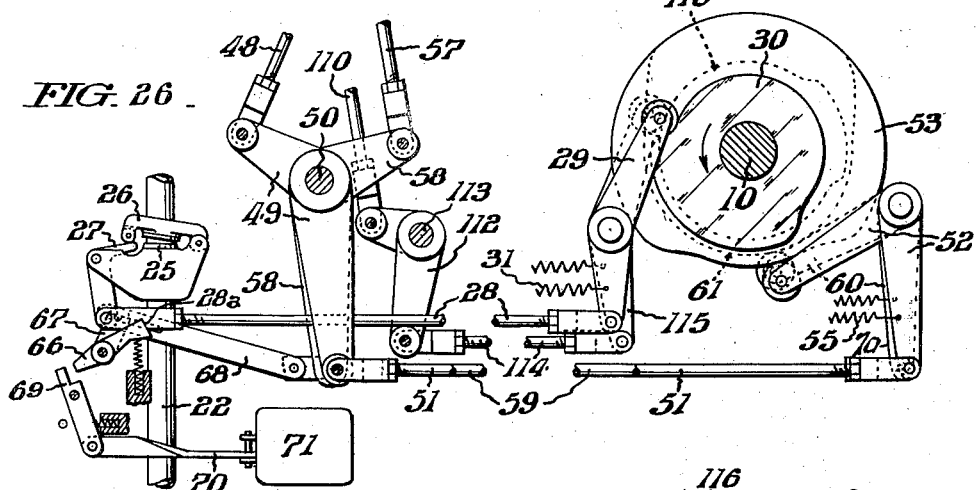
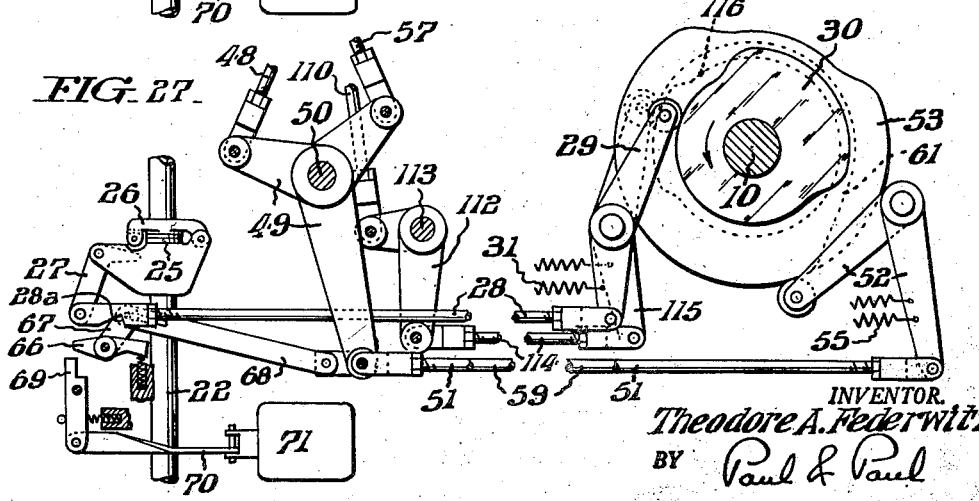

Nov. 26, 1957 T. A. FEDERWITZ 2,814,248
DUPLICATING MACHINES
Filed June 24, 1954 30 Sheets-Sheet 16
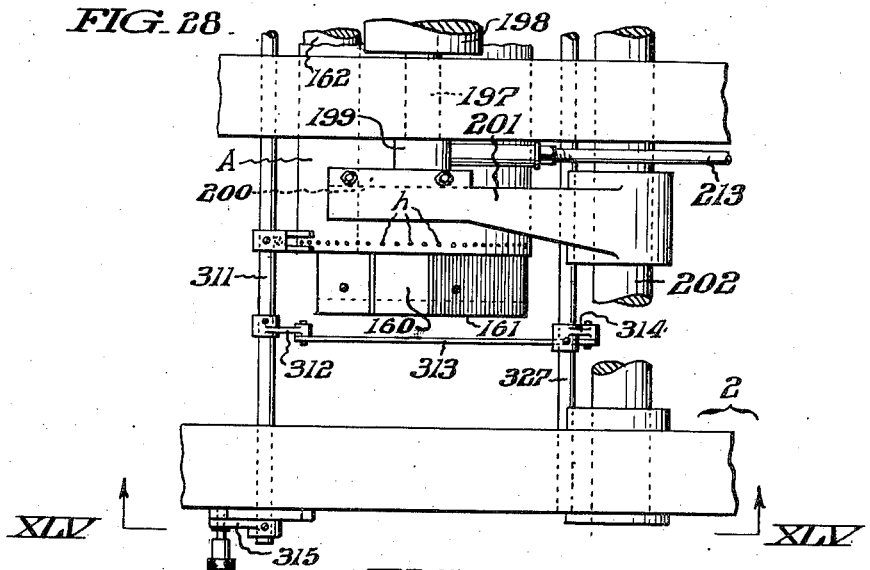
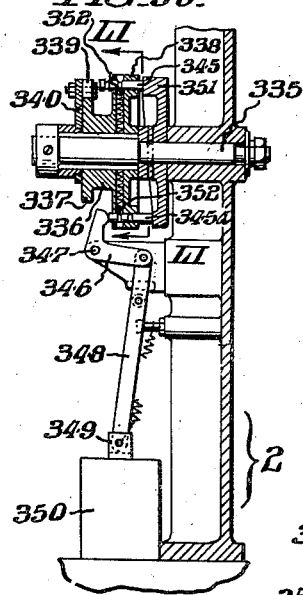
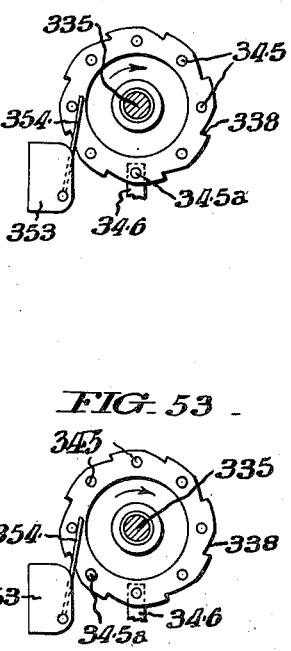
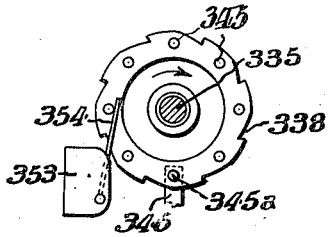
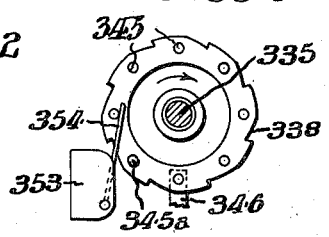
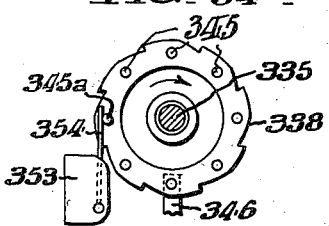
INVENTOR.
Theodore A. Federwitz,
BY Paul & Paul
ATTORNEYS.

Nov. 26, 1957 T. A. FEDERWITZ 2,814,248
DUPLICATING MACHINES
Filed June 24, 1954 30 Sheets-Sheet 17
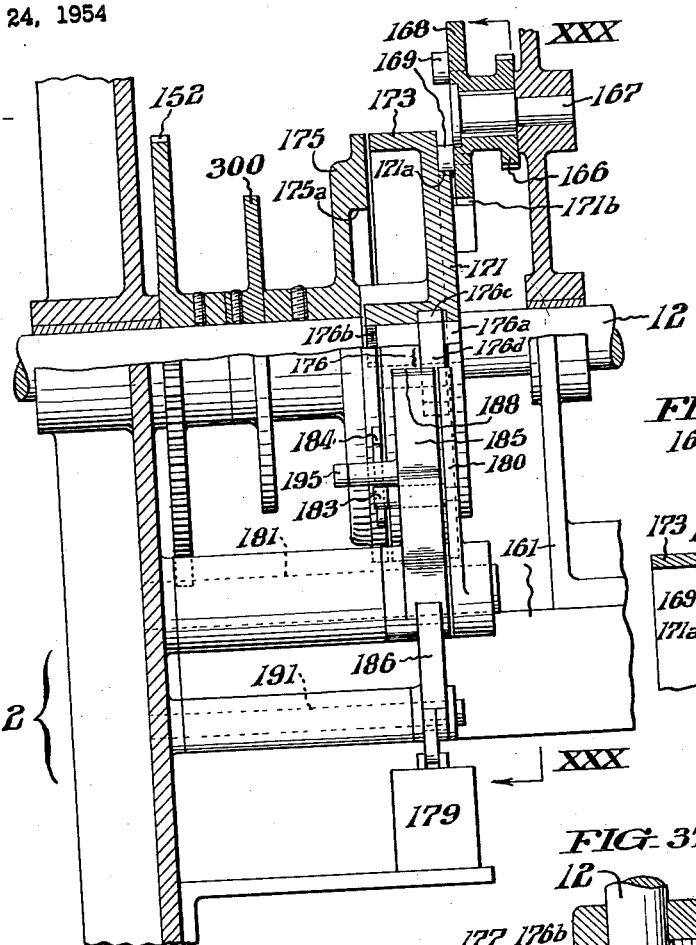
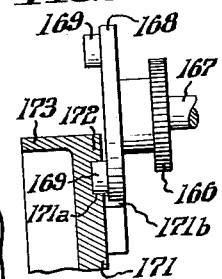
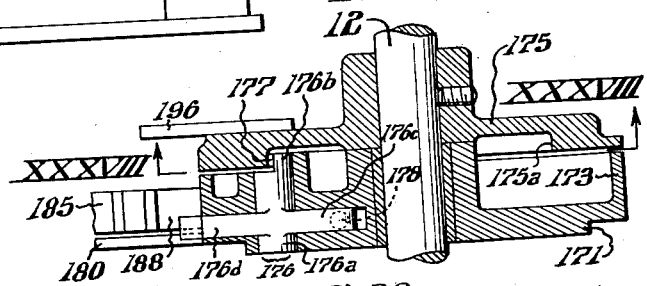
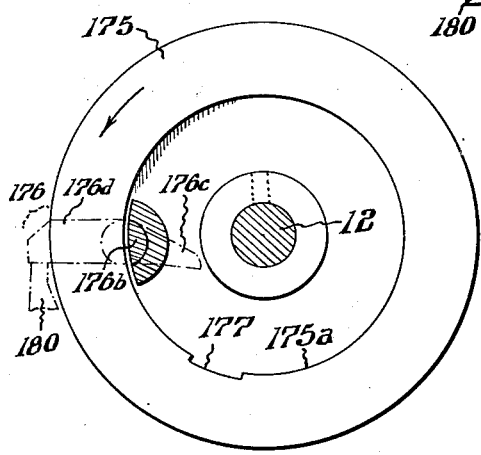
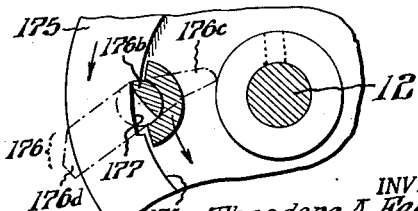
INVENTOR.
Theodore A. Federwitz,
BY Paul & Paul
ATTORNEYS.

Nov. 26, 1957
T. A. FEDERWITZ
2,814,248
DUPLICATING MACHINES
Filed June 24, 1954
30 Sheets-Sheet 18
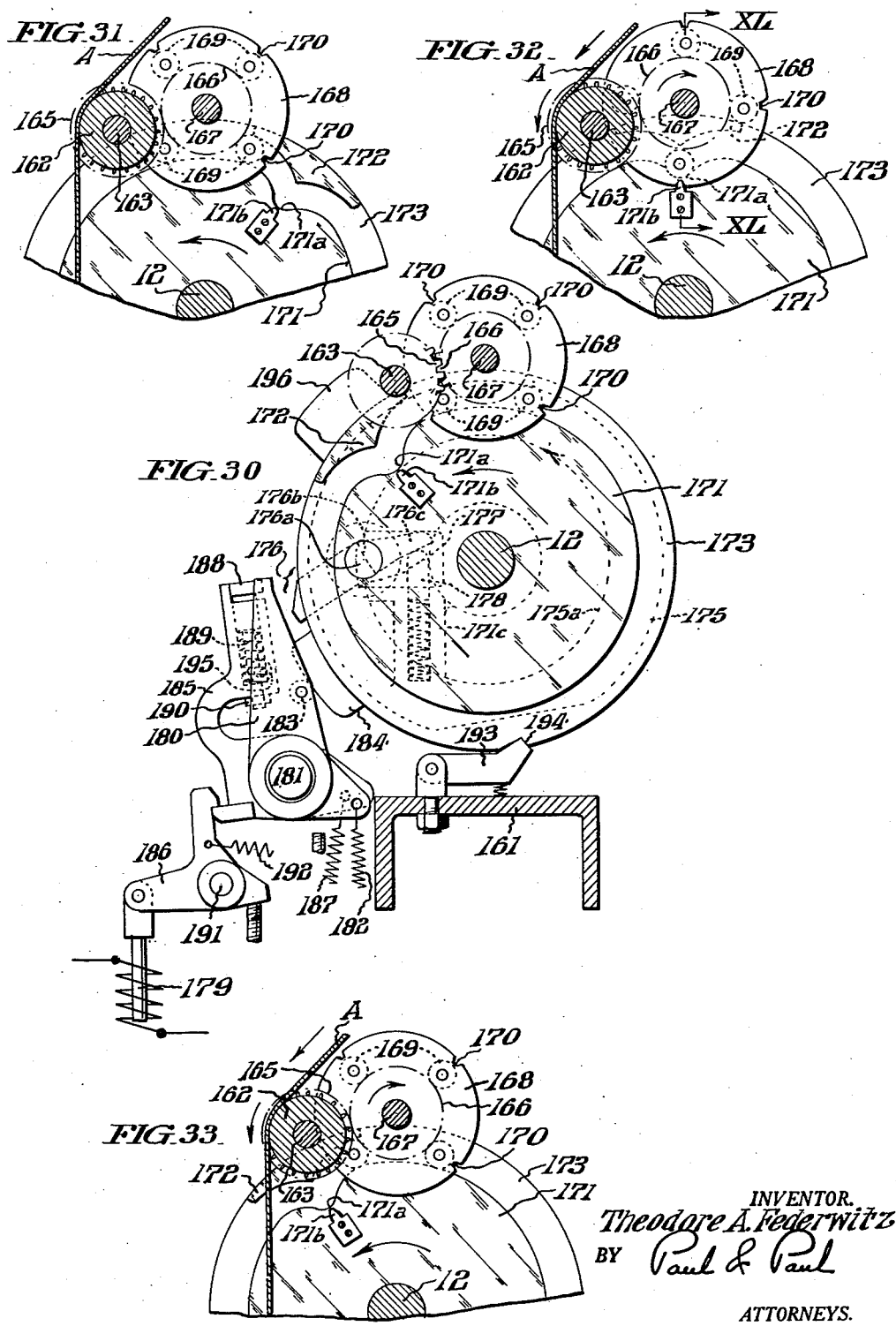
INVENTOR.
Theodore A. Federwitz,
BY Paul & Paul
ATTORNEYS.

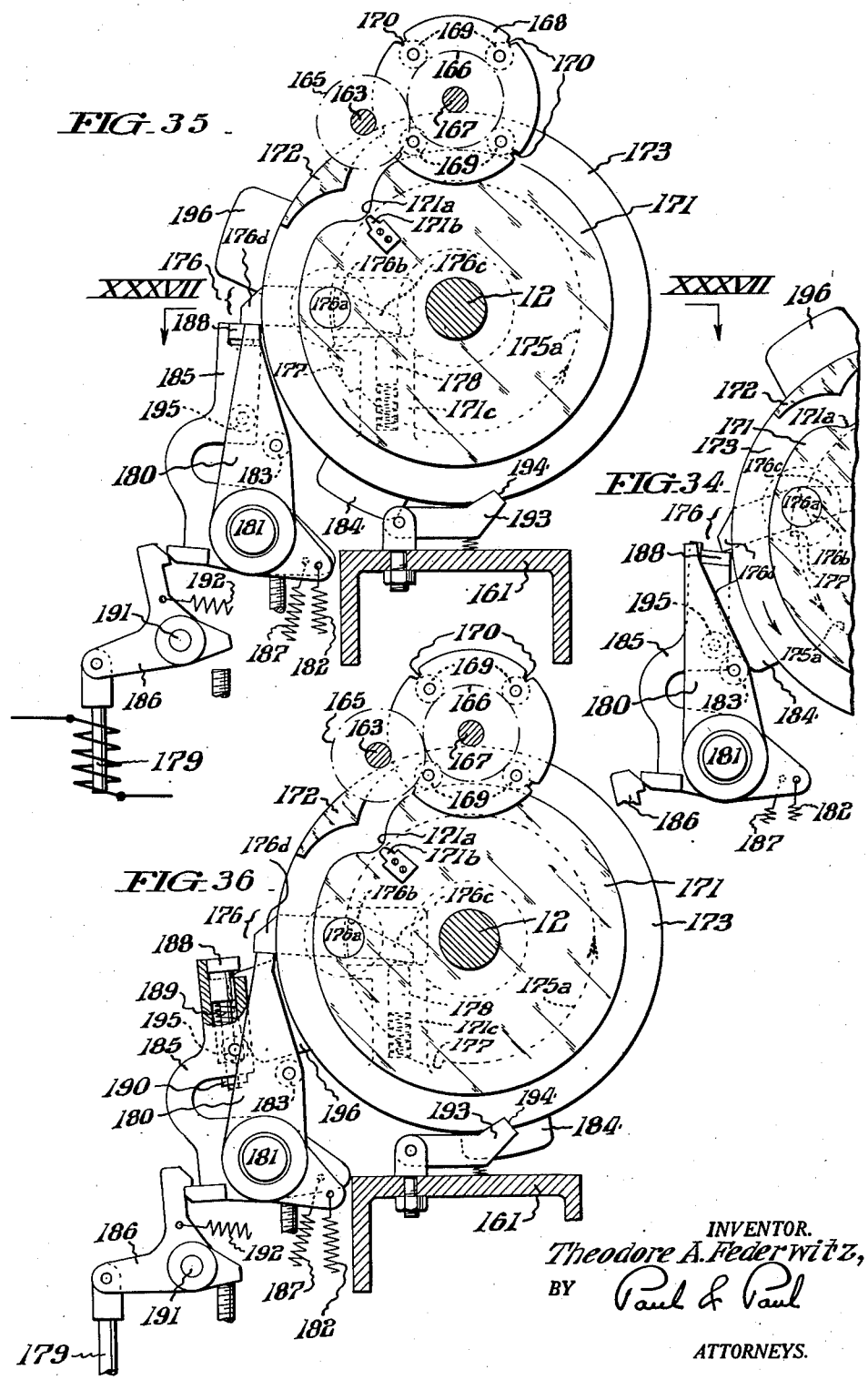

Nov. 26, 1957 T. A. FEDERWITZ 2,814,248
DUPLICATING MACHINES
Filed June 24, 1954 30 Sheets-Sheet 20
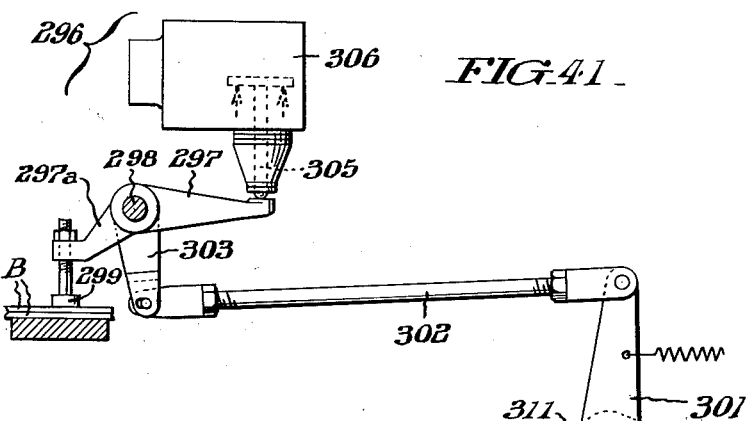
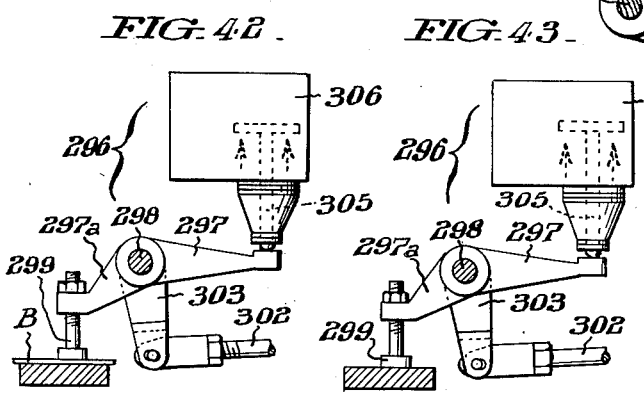
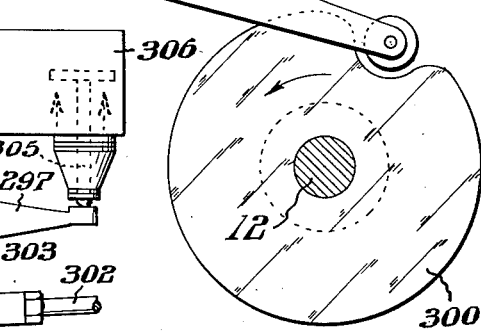
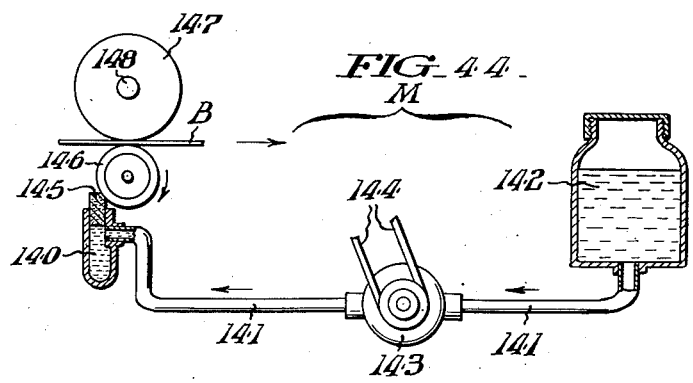
INVENTOR.
Theodore A. Federwitz,
BY Paul & Paul
ATTORNEYS.

Nov. 26, 1957 T. A. FEDERWITZ 2,814,248
DUPLICATING MACHINES
Filed June 24, 1954 30 Sheets-Sheet 21
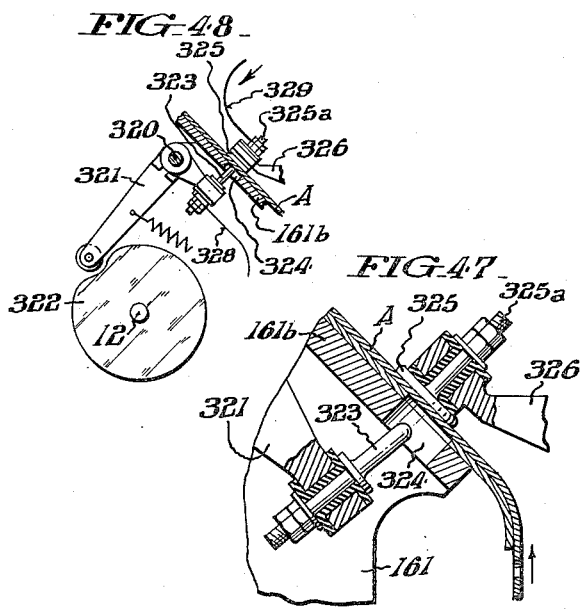
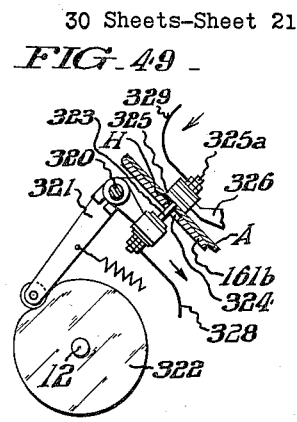
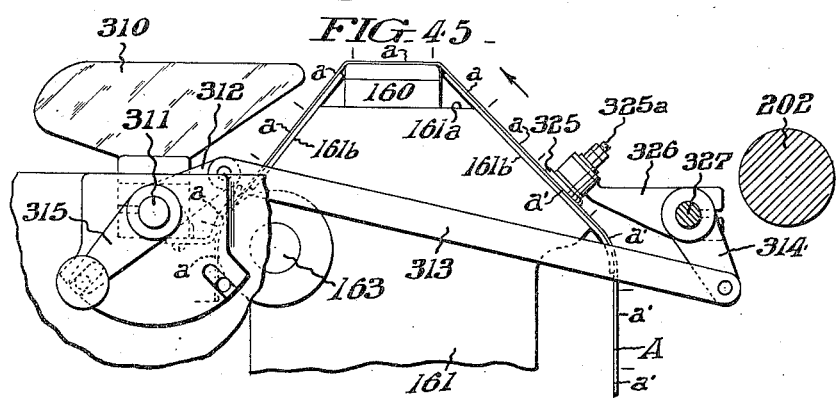
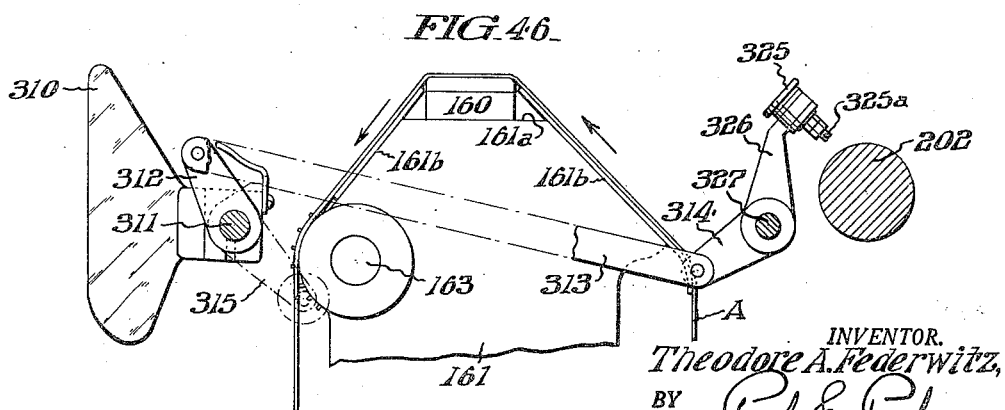
INVENTOR.
Theodore A. Federwitz,
BY Paul & Paul
ATTORNEYS.

Nov. 26, 1957 T. A. FEDERWITZ 2,814,248
DUPLICATING MACHINES
Filed June 24, 1954 30 Sheets-Sheet 22
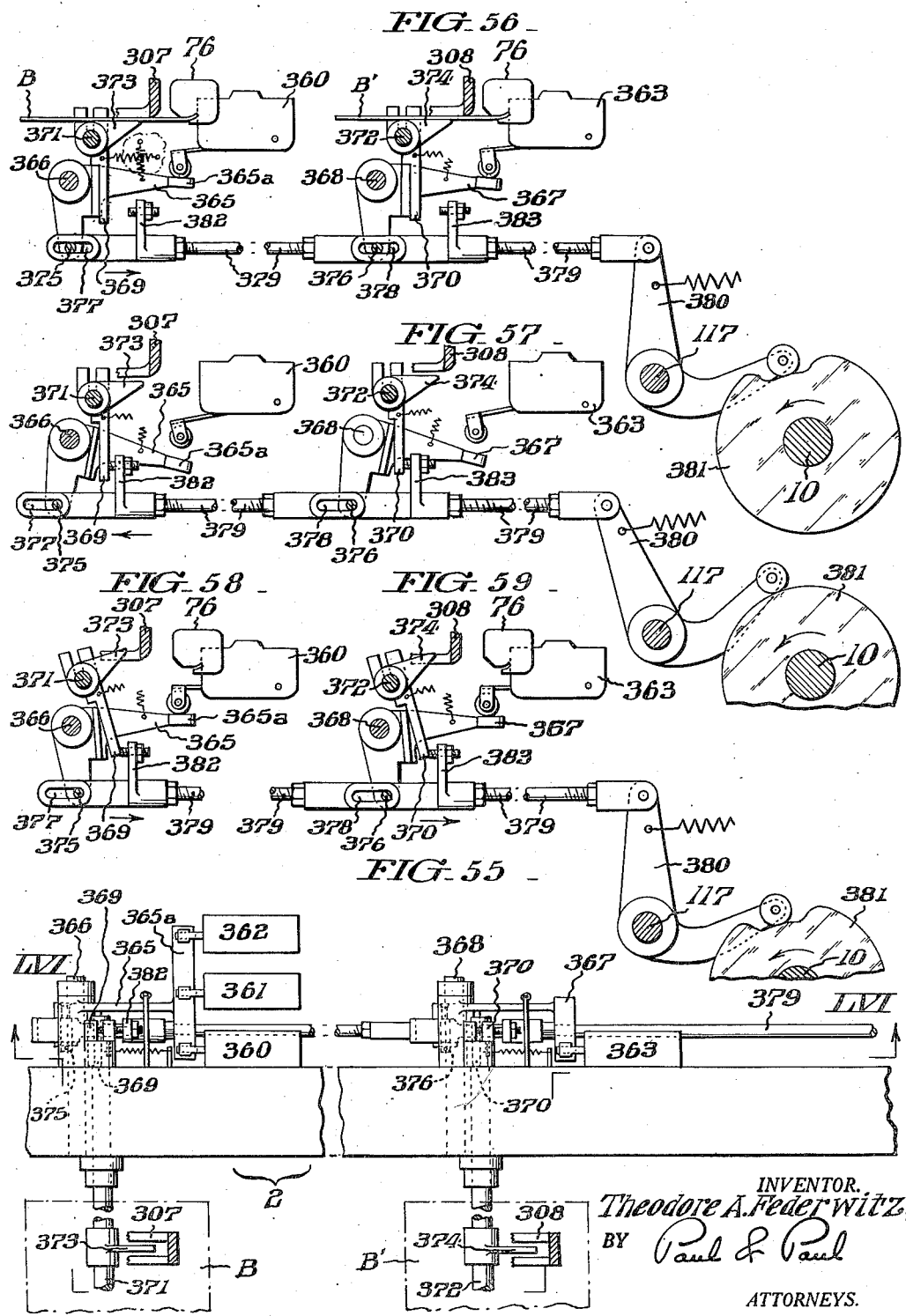
INVENTOR.
Theodore A. Federwitz,
BY Paul & Paul
ATTORNEYS.

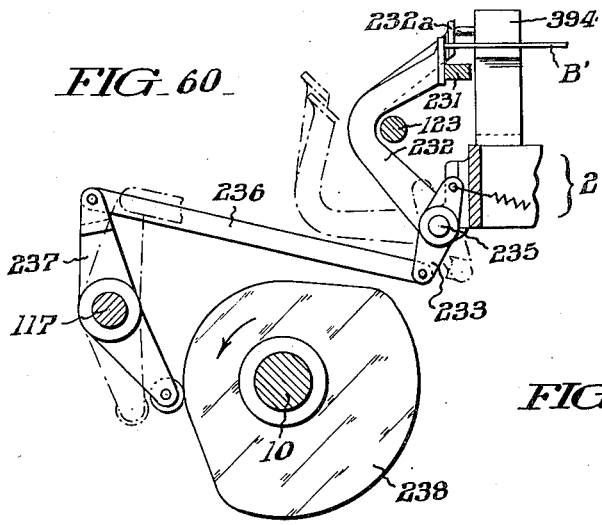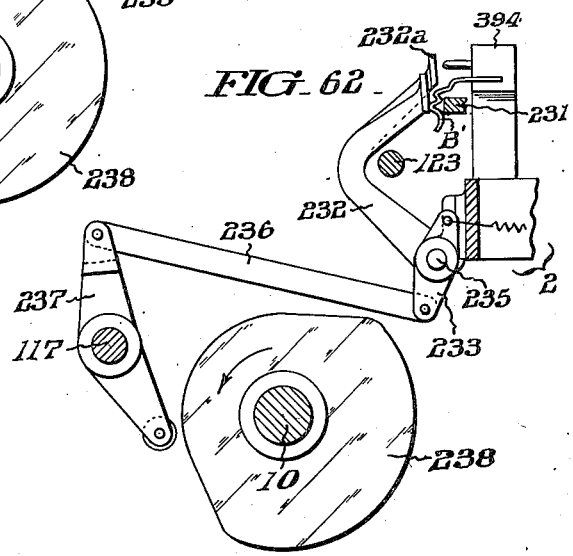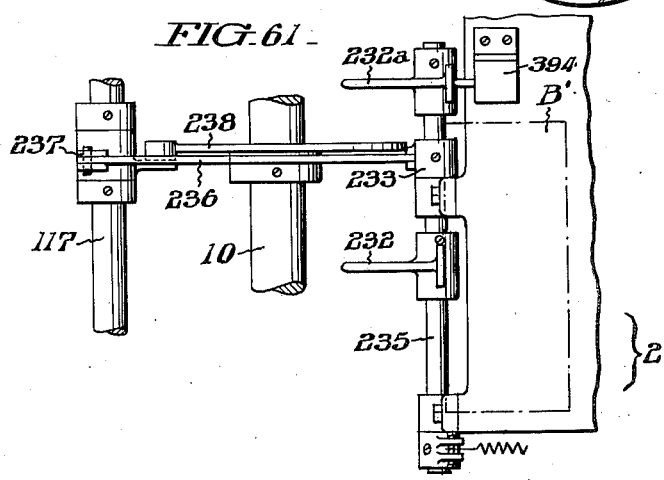

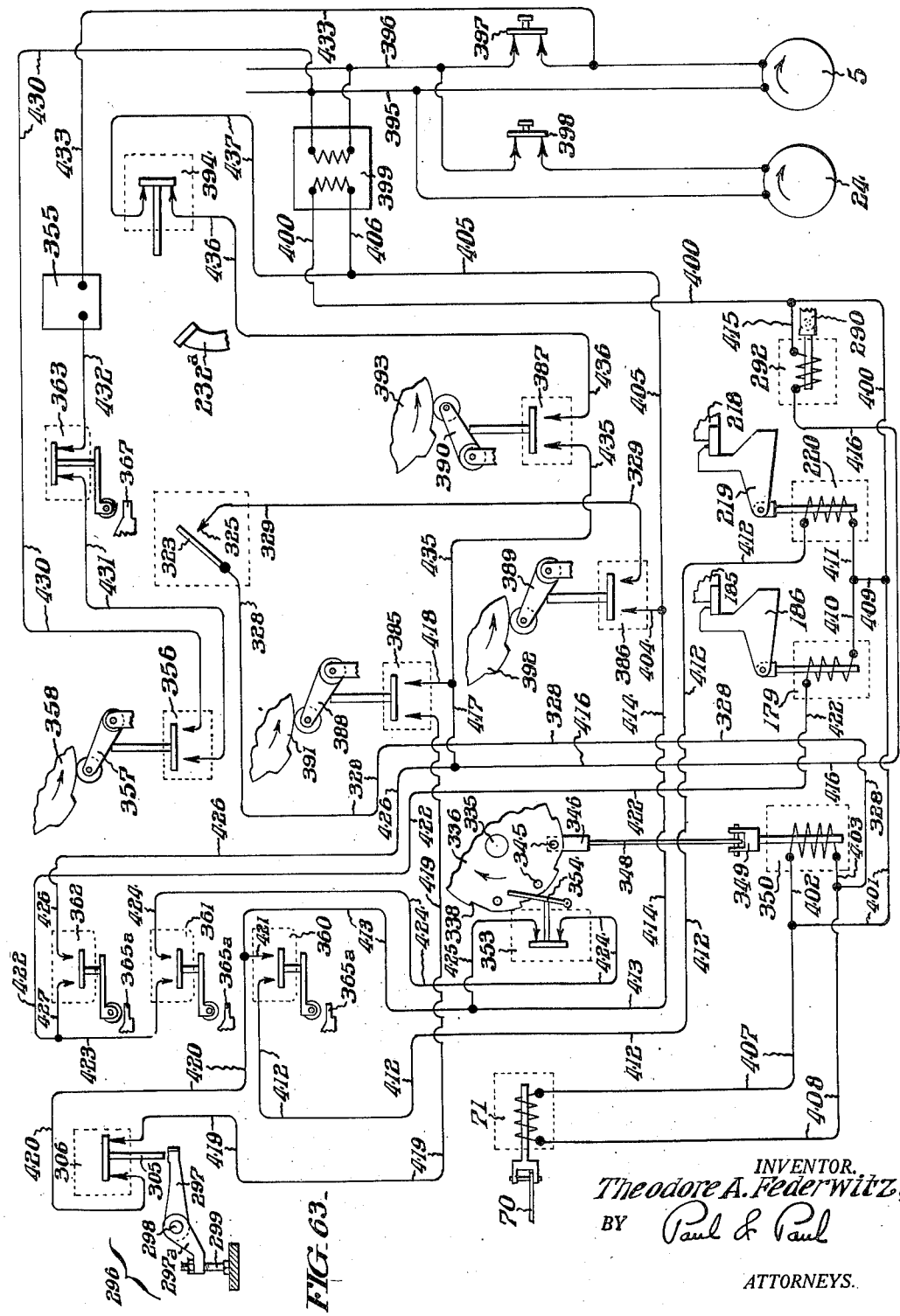

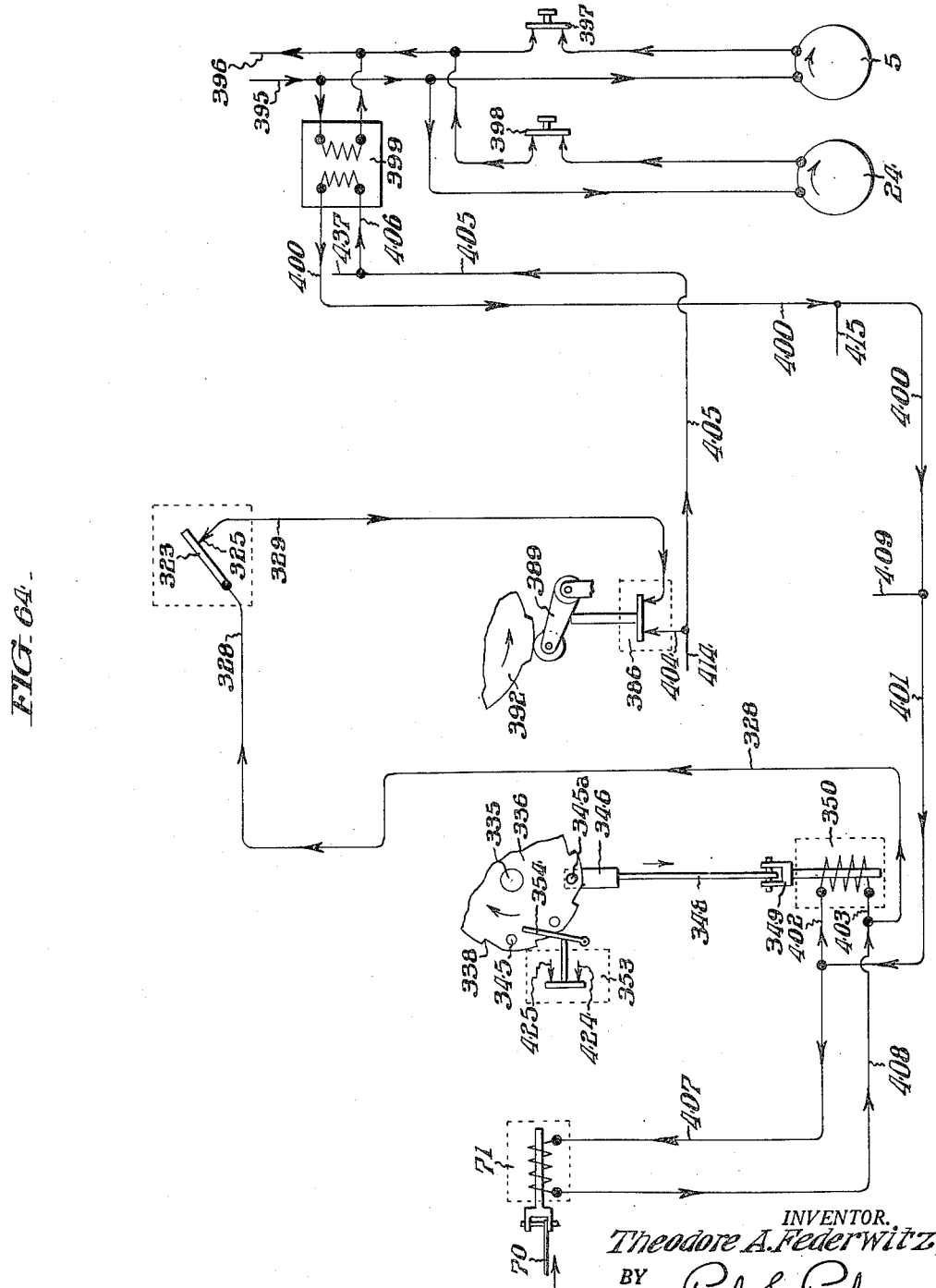

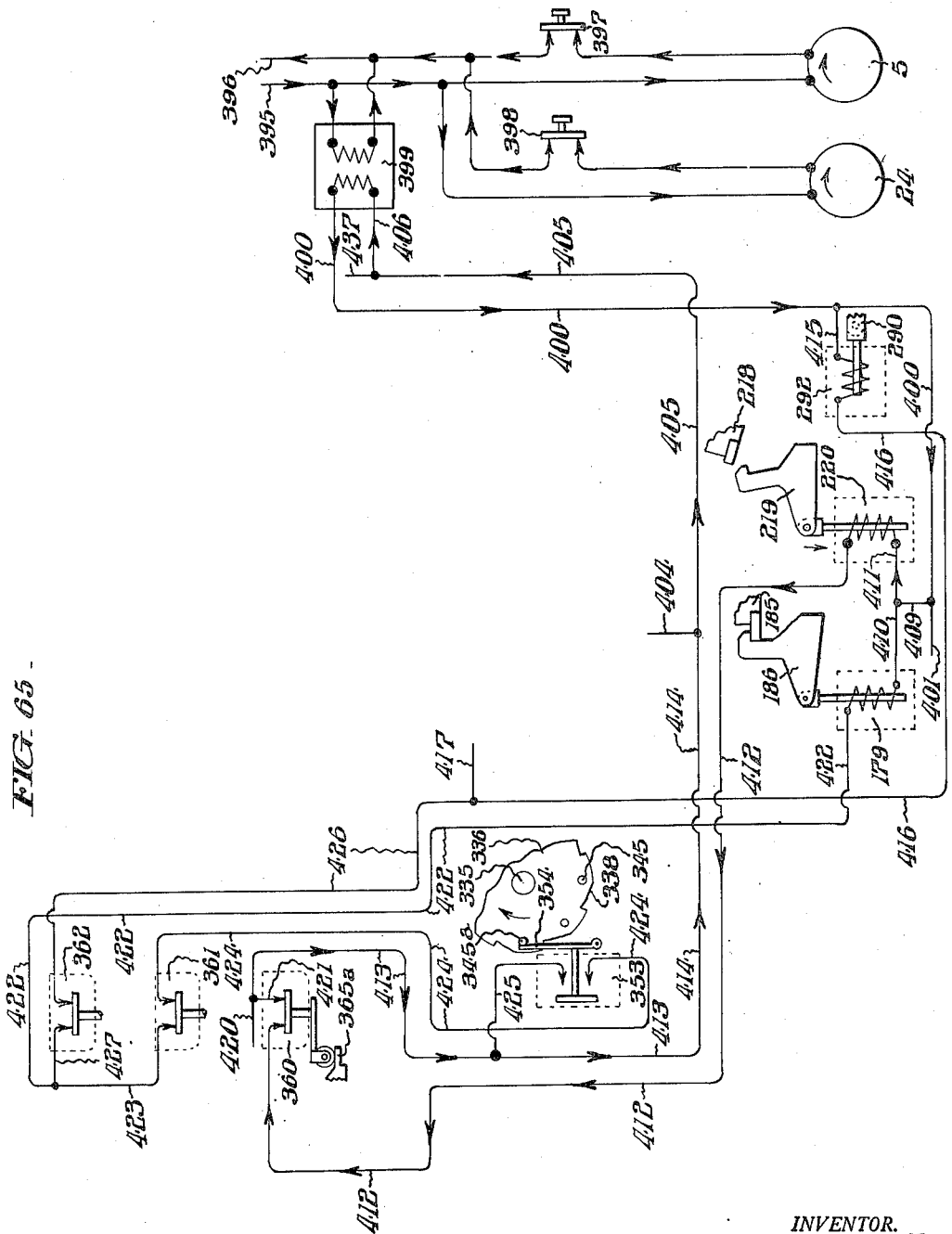

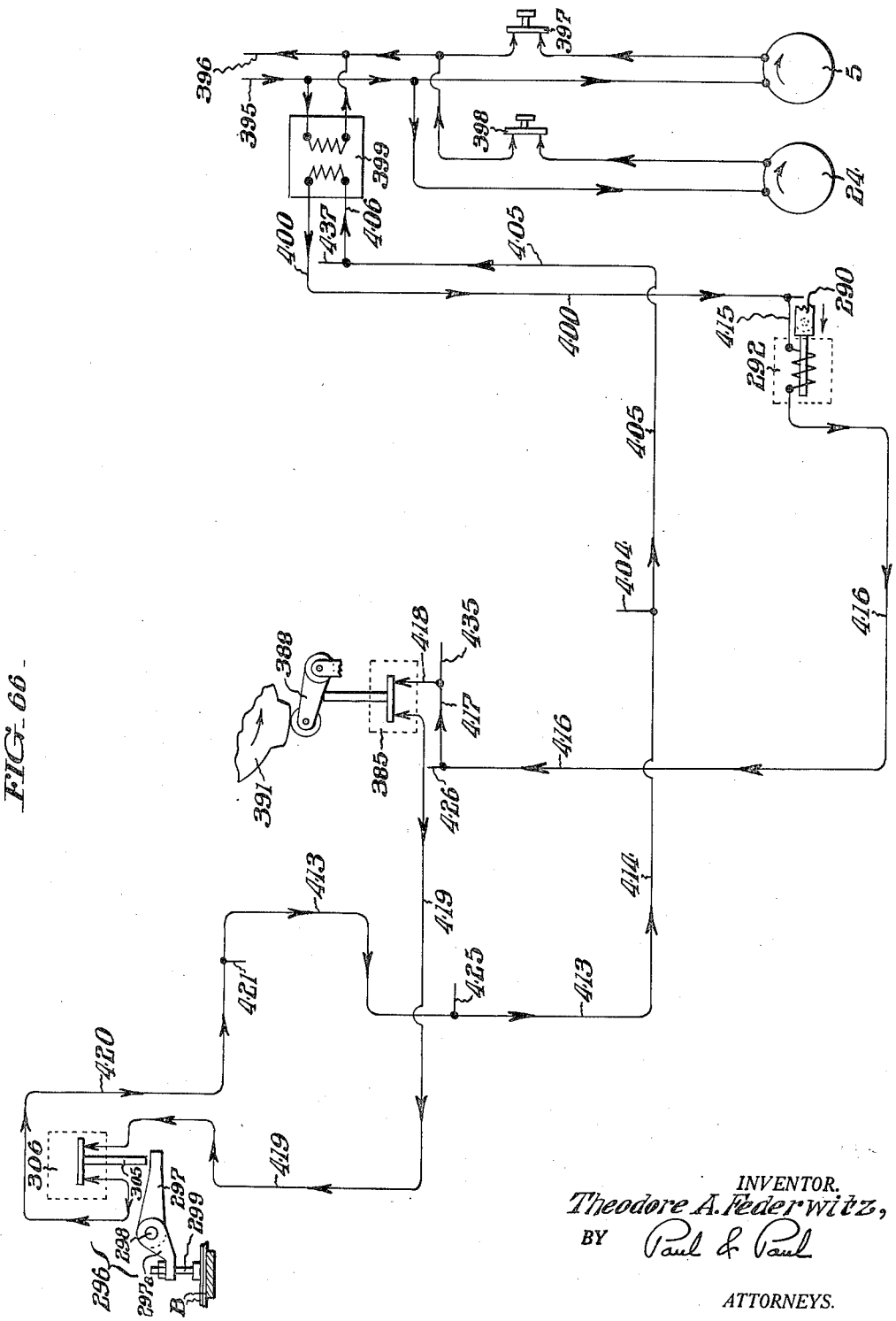

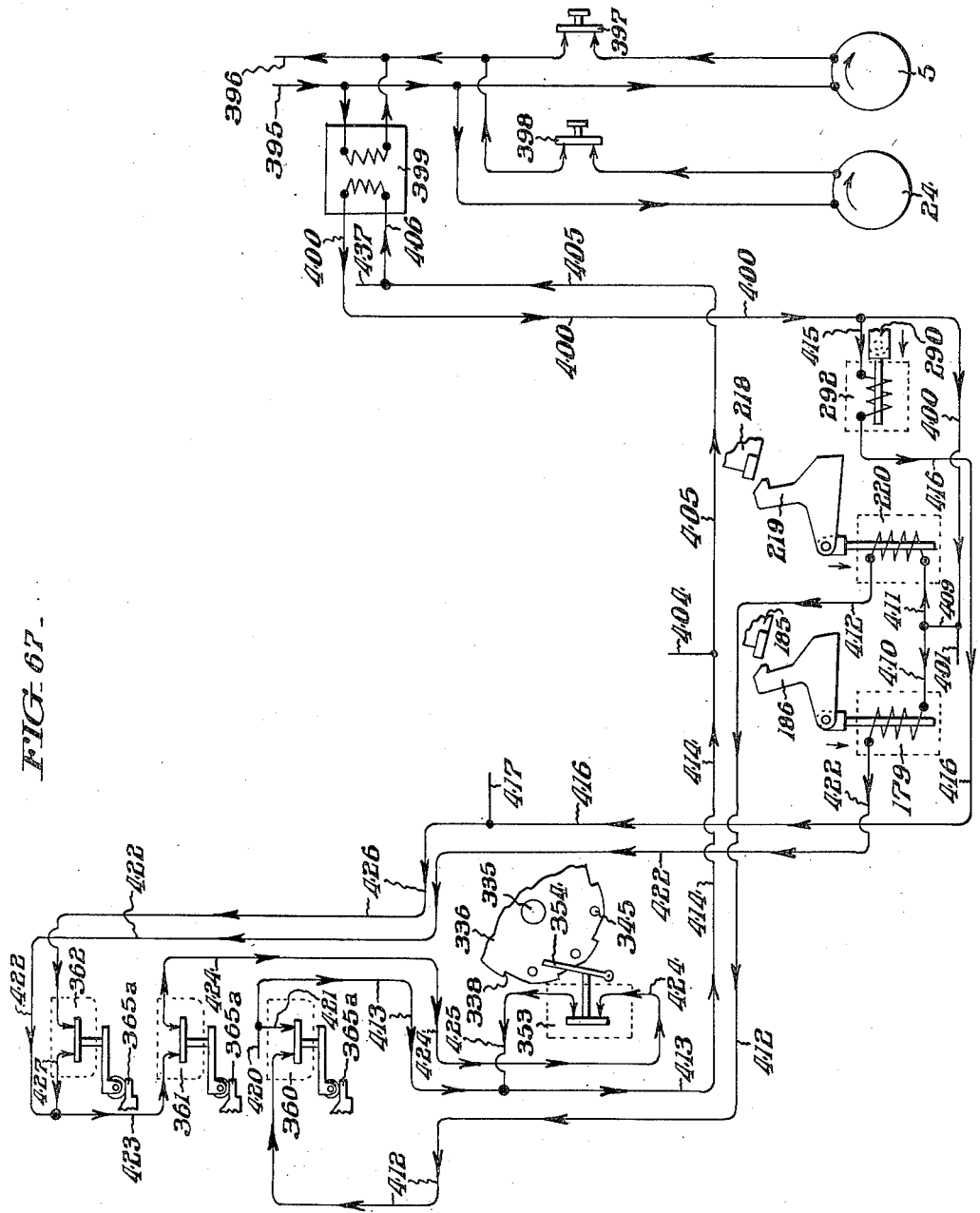

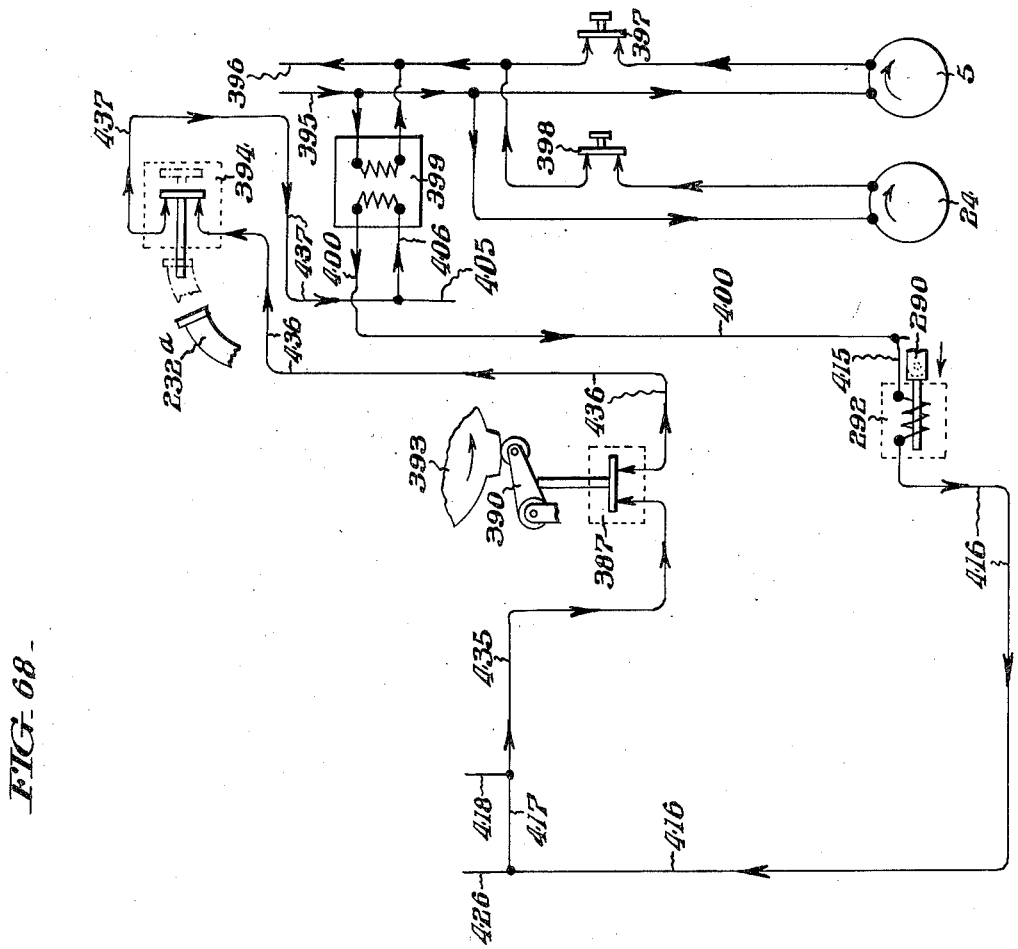

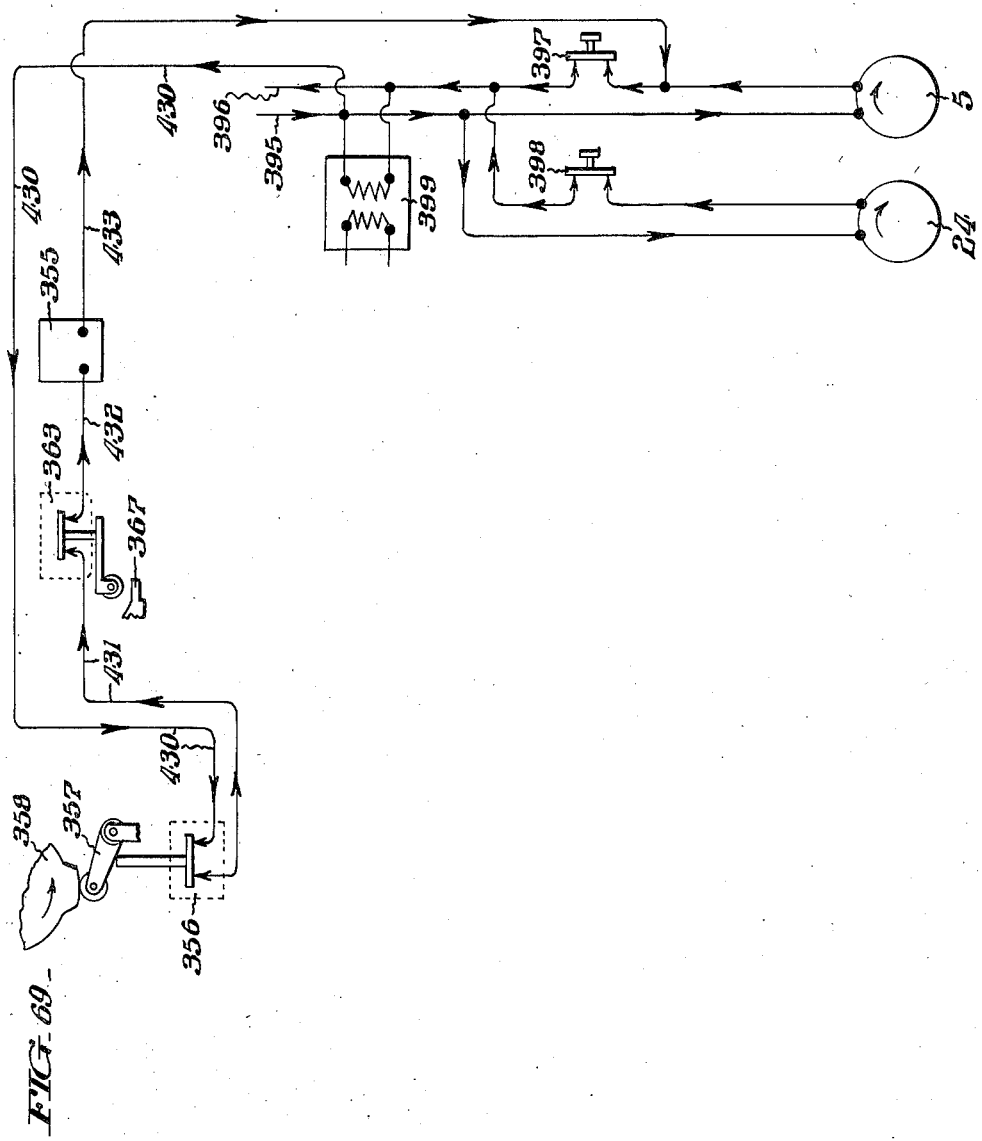

United States Patent Office 2,814,248
Patented Nov. 26, 1957

2,814,248

DUPLICATING MACHINES

Theodore Albert Federwitz, Philadelphia, Pa., assignor to Scriptomatic, Inc., Philadelphia, Pa., a corporation of Pennsylvania Application June 24, 1954, Serial No. 438,967

30 Claims. (Cl. 101—134.5)

This invention relates to duplicating machines. More particularly, it is concerned with duplicating machines of a type wherein data such as names and addresses and/or other information inscribed in copying ink upon a master strip, is transferred to mailing slips, letter sheets, bank checks, envelopes and the like.

The chief aim of my invention is to provide a compact and reliable machine of the kind referred to which is entirely automatic and operable at high speeds in removing the sheets to be printed successively from a supply stack, pressing them upon data bearing areas of an intermittently-progressed master strip while said areas are temporarily arrested on a fixed platen to receive impressions therefrom, and of subsequently collecting the printed sheets in a pile in the same serial order as originally arranged in the supply pile.

In connection with a duplicating machine having the above attributes, it is a further aim of my invention to provide automatic means to prevent feeding of individual blanks in the event that areas of the master strip bearing erroneously inscribed data are presented at the platen.

Another object of my invention is to provide automatic means for stopping the machine upon depletion of the supply of the blanks and/or running out of the master strip; in the event that more than one blank is fed at a time from the supply; and in the event of crushing of a blank in its passage through the machine.

Other objects and attendant advantages will appear from the following detailed description of the attached drawings, wherein:

Figs. 1–8 are diagrammatic longitudinal views of a duplicating machine conveniently embodying my present invention, showing the machine under different conditions of operation.

Fig. 9 is a skeletonized top plan view of the machine drawn to a larger scale with a portion broken out at the center.

Figure 13:
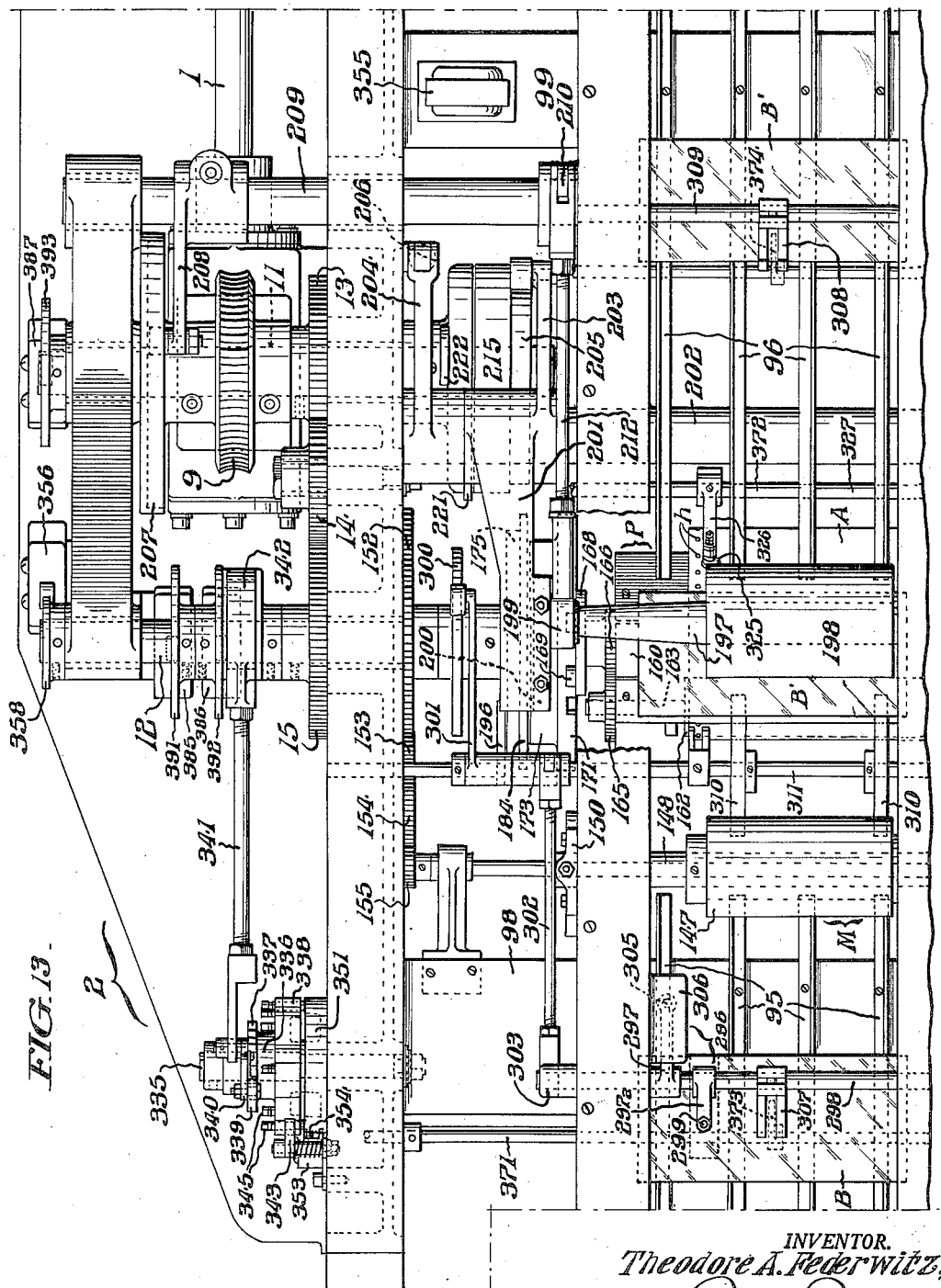

Figs. 10, 11 and 12 taken together, show, on a still larger scale, a longitudinal sectional view of the machine taken as indicated by the angled arrows XII—XII in Fig. 9.

Fig. 13 is a fragmentary view in top plan of the mid portion of the machine shown in Fig. 11.

Fig. 14 is a cross section taken as indicated by the angled arrows XIV—XIV in Fig. 11.

Fig. 15 is a fragmentary view in cross section taken as indicated by the angled arrows XV—XV in Fig. 9.

Fig. 16 is a fragmentary view looking as indicated by the angled arrows XVI—XVI in Figs. 9 and 15.

Fig. 17 is a fragmentary view in horizontal section taken as indicated by the angled arrows XVII—XVII in Fig. 12.

Figs. 18 and 19 are vertical sectional views taken as indicated by the angled arrows XVIII—XVIII and XIX—XIX respectively in Fig. 10.

Fig. 20 is a fragmentary view showing in detail one of the chain grippers.

Fig. 21 is a fragmentary view partly in elevation and partly in longitudinal section taken as indicated by the angled arrows XXI—XXI in Fig. 9 showing more particularly the drive clutch control mechanism of the machine.

Figs. 22–24 are views generally similar to Fig. 21 showing the parts of the clutch control mechanism under different conditions of operation.

Fig. 25 is a broken out fragmentary view showing part of the mechanism by which the blank feeding mechanism is operated and controlled.

Figs. 26 and 27 are views like Fig. 25 showing the mechanism of the latter in various stages of operation.

Fig. 28 is a fragmentary view drawn to a larger scale than Fig. 9 and showing a portion of the printing mechanism in top plan.

Fig. 29 is a fragmentary view in transverse section taken as indicated by the angled arrows XXIX—XXIX in Fig. 11 showing a portion of the master sheet progressing mechanism.

Fig. 30 is a fragmentary view in section taken as indicated by the angled arrows XXX—XXX in Figs. 9, 14 and 29.

Figs. 31–36 are views similar to Fig. 30 showing the parts of the master strip advancing mechanism in different stages of operation.

Fig. 37 is a fragmentary sectional view taken as indicated by the angled arrows XXXVII—XXXVII in Fig. 35.

Fig. 38 is a detail section taken as indicated by the angled arrows XXXVIII—XXXVIII in Fig. 37.

Fig. 39 is a view corresponding to Fig. 38 with the parts differently positioned.

Fig. 40 is a detail sectional view taken as indicated by the angled arrows XL—XL in Fig. 32.

Fig. 41 is a view corresponding generally to Fig. 11 showing in detail the blank detector and the mechanism for actuating it.

Figs. 42 and 43 are views like Fig. 41 but with the parts differently positioned.

Fig. 44 is a diagrammatic view showing the means provided for applying solvent to the blanks in preparation for the printing.

Fig. 45 is a fragmentary view in elevation looking as indicated by the angled arrows XLV—XLV in Fig. 28 showing the detector means for sensing the master strip and the means provided for retracting one of the elements of the detector to facilitate placement of the master strip in the machine.

Fig. 46 is like Fig. 45 but showing the detector element retracted.

Fig. 47 is a fragmentary view in section through the platen support drawn to a larger scale to better show the details of the strip detector means.

Figs. 48 and 49 are views like Fig. 47 showing the parts of the strip detector in different positions of operation.

Fig. 50 is a fragmentary view in section taken as indicated by the angled arrows L—L in Fig. 11.

Fig. 51 is a detail sectional view taken as indicated by the angled arrows LI—LI in Fig. 50.

Figs. 52–54 are views like Fig. 51 but with the parts differently positioned.

Fig. 55 is a fragmentary view in top plan looking as indicated by the angled arrows LV—LV in Fig. 14 and showing a group of switches which are instrumental in the operation of various electrical appurtenances used in controlling the functioning of the machine.

Fig. 56 is a fragmentary view in longitudinal section taken as indicated by the angled arrows LVI—LVI in Fig. 55.

Figs. 57–59 are views similar to Figs. 56 and 57 respectively with the parts differently positioned.

Fig. 60 is a fragmentary view corresponding generally to Fig. 12, illustrating, more clearly, part of the mechanism provided for automatically stopping the machine in the event that one of the sheets after being printed is crushed at the stacking means.

Fig. 61 shows the mechanism of Fig. 60 in top plan.

Fig. 62 is a view similar to Fig. 60 showing how the mechanism is affected by a crushed sheet.

Fig. 63 is a wiring diagram showing the circuit connections between the electrical control instrumentalities.

Figs. 64–69 are views similar to Fig. 63 showing the control system under different operating conditions of the machine, only those circuits which are closed in each instance being shown for the sake of simplicity of illustration.

Fig. 70 is a perspective view of a blank sheet of a kind for the printing of which the machine is designed.

Fig. 71 shows the sheet after having been printed in the machine; and

Fig. 72 is a fragmentary view of the master strip from which the data is transferred to the blank.

As diagrammatically shown in Figs. 1–8 of these illustrations, my improved duplicating machine comprises, basically, a mechanism F for feeding the sheets which are to be printed; a horizontally-arranged intermittently-actuated conveyer mechanism C; a printing mechanism P by which data is transferred from an intermittently-advanced master strip A to the successively advanced sheets B which may be blank checks for example, and which will be so referred to hereinafter, and a mechanism S for receiving and stacking the checks after they have been printed. In order to facilitate the understanding of these several mechanisms, they and other coordinated mechanisms of the machine will be described under separate appropriate captions, as follows:

Drive mechanism

The drive mechanism of the machine, see Figs. 11, 12 and 21, comprises a longitudinally-extending shaft 1 which is journalled in suitable bearings in the lower part of the framework 2 and which is arranged to be rotated under control of a clutch 3, through a pulley 4 and a multiple belt connection 4a from an electric motor shown at 5 in Figs. 60–66. Affixed to the main shaft 1 are worms 6 and 7 which mesh with worm wheels 8 and 9 respectively on transverse cam shafts 10 and 11 which, like said main shaft, are rotatively supported in suitable bearings on the framework 2. Another transverse cam shaft designated 12 is driven through a train of spur gears 13, 14 and 15 in the same direction and at the same speed from the cam shaft 11. As later on explained, the conveyer mechanism C, the blank check feeding mechanism F and the stacking mechanism S are actuated by cams on the shaft 10, and the printing mechanism P by cams on the shafts 11 and 12.

Check feeding mechanism

This mechanism is generally similar to the corresponding mechanism disclosed in my co-pending patent application Serial No. 225,591, filed by me on May 10, 1951. Briefly described, this mechanism comprises, as best shown in Figs. 1 and 10, a suction pick up element 20 which, by means of a flexible tube 21, is connected to an upright pipe 22 fixed within the framework 2, and leading, see Fig. 1, from the intake side of a suction blower 23 driven by an electric motor indicated at 24 in Figs. 63–69. Interposed in the pipe 22 is a relief or cutoff valve 25 whereof the cap 26 is arranged to be lifted by a finger 27 which, through a horizontal link rod 28, is connected to one arm of a bell crank lever 29, see Figs. 12 and 25, having on its other arm a roller in running engagement with the periphery of an actuating cam 30 on the shaft 10. A spring shown at 31 in Fig. 25 acts upon the rod 28 to maintain the roller of the bell crank lever 29 in engagement with the cam 30. By means of an arm 32 and a link 33, the pick-up element 20 is connected to bell cranks 34 and 35 respectively on rock shafts 36 and 37, said bell cranks being connected, in turn, by a pair of short parallel links 38 and 39. Lift movements are imparted to the pick-up element 20 from another rock shaft 40 having an arm 41 thereon which, by a drop link 42, is connected to the link 33 at a point intermediate the ends of the latter. The shaft 40 is rocked by virtue of the connection of another arm 43 thereon through a link rod 45 with an oscillated arm 46 fulcrumed at 47 and connected, in turn, through a drop link 48, to one arm of a bell crank 49 freely fulcrumed on a fixed stud 50. The other arm of the bell crank 49 is connected, through a horizontal link rod 51, with one arm of another bell crank 52 (see Figs. 12 and 25) whereof the second arm carries a roller which rides on the periphery of a second rotary cam 53 on the shaft 10, the last mentioned link rod being yieldingly urged leftward by the spring shown at 55 in Fig. 25 for maintenance of said roller in engagement with said cam. Advance movements are imparted to the pick up element 20 from the rock shaft 37 (Fig. 10), the latter being provided with an arm 56 which, through an inclined link rod 57, is connected to one arm of another bell crank 58 free on the shaft 50 with the bell crank 49 previously referred to. The drop arm of the bell crank 58 is connected, in turn, by another horizontal link rod 59 to the corresponding arm of a separate bell crank 60 (Fig. 26) freely fulcrumed on the same shaft as the bell crank 52. As shown, the bell crank 60 has a roller on its shorter arm in running contact with a third rotary cam 61 on the shaft 10. The table 62 (Fig. 10), on which the blank checks B are supported, is connected to an elevator 63 which is constrained to up and down movement in a guideway afforded by the framework 2. The elevator 63 is connected to an endless chain 64 which is trained over a pair of vertically-spaced sprocket wheels whereof the upper one only is shown at 65 in Fig. 10. It is to be understood that the chain 64 is actuated in the same manner as in my pending application hereinbefore referred to, to raise the table 62 progressively and compensatively with depletion of the check pile.

In order to hold the valve 25 open under certain conditions as hereinafter pointed out, I have provided a medially-pivoted spring-loaded detent 66 (Figs. 10, 18, 19, 25–27), which is adapted to lock into a notch 28a in the clevis at the adjacent end of the rod 28. An arm 67 fast on the pivot of the detent 66 has a loose pin and slot connection with a link 68 coupled with one end of another rod 59 which extends longitudinally of the machine as hereinbefore described. Normally, the detent 66 is held in the position of Fig. 10 by a medially-pivoted spring-biased trigger 69 which, by means of a link 70, is connected to the armature of a solenoid indicated at 71. Separation of the blank checks 13 in the pile on the table 62 is facilitated by air blown laterally into the pile from a perforated nozzle head 72 at the top end of a hose 73 which is connected to the pressure outlet of the blower 23 as shown in Fig. 1.

Conveyer mechanism

This mechanism comprises a pair of laterally-spaced endless chains 75 which at uniformly-spaced intervals carries grippers 76, and which are trained about end sprockets 77 and 78 on cross shafts 79 and 80 suitably journalled in the framework 2 at opposite ends of the machine. One end of the sprocket shaft 79 extends into a housing 81 (Figs. 15 and 16) at one side of the machine and affixed thereto is a spur pinion 82 which meshes with a similar spur pinion 83 on a stud 84 within said housing. The pinion 83 is adapted to mesh in turn with the teeth of a large mutilated gear wheel 85 on the corresponding end of the cam shaft 10 which also extends into the housing. Mounted in quadrant relation on the gear wheel 85 are rolls 86 which, by cooperation with a triangular cam piece 87 on the shaft 84 of the pinion 83 cause said shaft to be rotated through a complete turn during each revolution of the cam shaft 10. By this means, the conveyer chains 75 are moved, at each actuation, to advance the checks a definite prescribed distance in the machine. Accidental shifting of the chains 75 during the dwell periods is prevented by cooperation of a pair of quadrantly spaced rollers 88 on a disk 89 affixed to the pinion 83 with the concentric portion 90 of a rotary cam 91 affixed to the mutilated gear wheel 85, said cam having depressions 92 for clearing said rollers during the rotations of said pinion. During the dwell periods of the conveyer, the checks B are temporarily arrested upon laterally-spaced bars 95 and 96 supported respectively on crosswise members 98, 99 and 100 of the framework 2.

The grippers 76 on the main conveyer chains 78 are adapted to engage the leading edges of the blank checks as the latter are individually presented thereto by the pick-up element 20, which may be like those disclosed in my prior application. As exemplified in Fig. 20, each such gripper comprises a clamp member 105 which is fixedly secured to a link of the main conveyer C and a cooperative clamp jaw 106 which is pivoted on said clamp member. By means of a spring urged ball 107 acting upon an upward cam projection of the jaw 106, the latter is normally maintained in clamping position. During presentation of a blank check by the pick-up element 20, the jaws 106 of the pick-ups are moved to open position as in Fig. 20 through depression of their cam projections by a finger 108 (Fig. 10), fixed upon another crosswise rock shaft 109. Through a drop link rod 110, an arm 111 on the rock shaft 109 is coupled with one arm of a bell crank 112 fulcrumed to swing about a fixed axis 113 on the machine framework, the other arm of said bell crank being connected through still another horizontal link bar 114 to one arm of a third bell crank 115 (Fig. 25) and having on its other arm a roller in running contact with a third rotary cam 116 on the shaft 10.

Like the main conveyer C, the shorter auxiliary conveyer comprehensively designated C' comprises two laterally spaced chains 120 which are trained about end sprockets 121 and 122 respectively mounted on shafts 123 and 124, see Fig. 12. The auxiliary conveyer C' is intermittently actuated in synchronism with the main conveyer C through a train of three spur gears 125, 126 and 127 (Figs. 15 and 16) of which the first is affixed to the shaft 123 and the last to the stud 84. Secured to the chains 120 of the auxiliary conveyer in transversely aligned relation are pusher lugs 128 which engage behind the printed checks upon their release from the main conveyor to advance the checks successively to the stacking mechanism S. Such release of the checks is effected through opening of the pivoted jaws of the grippers by means of the fixed cam shoes 130 which act to depress the cam extensions of said jaws as shown in Fig. 12. Upon being released, each check is temporarily arrested by stop fingers 131 which cooperate with fixed blocks 132 and which are secured to a crosswise rock shaft 133. Through a link rod 134, an arm 135 on the rock shaft is coupled with one arm of a bell crank lever 136 freely fulcrumed on a fixed axis 117. The other arm of the bell crank 136 carries a roller which runs on the periphery of a rotary actuating cam 137 affixed to the shaft 10.

*Blank check moistening mechanism*

The means by which the bottom faces of the blank checks are moistened en route to the printing means P comprises, as shown in Figs. 11, 12 and 44, a small trough 140 to which moistening fluid, i. e., ink solvent, is conducted through a pipe 141 from a supply source by an interposed rotary pump 143 which, see Fig. 12, is driven by a belt 144 from the cam shaft 10. Projecting upward from the trough 140 is a wick 145 by which the fluid is fed to a roll 146 for application to the bottom faces of the passing blank checks while the latter are pressed down by a cooperative roll 147. The ends of the shaft 148 of the roll 147 are journalled, as instanced in Fig. 11, in bearings 149 constrained to vertical guideways 150 on the framework and yieldingly urged downwardly by springs 151. The applicator roll 146 is positively driven at a peripheral speed corresponding to the linear speed of the main conveyer through the medium of a chain of intermeshing spur gears 152, 153, 154 and 155 from the cam shaft 12.

*Printing mechanism*

For the description of the printing mechanism P, reference will be had to Figs. 9, 11, 13, 14, 28–40 and 45–49. From these illustrations it will be observed that the platen 160 of this means is fixedly supported on the top horizontal portion 161a of another cross member 161 of the machine framework 2, said top portion being flanked by side portions 161b which are downwardly inclined at complementary angles of approximately forty-five degrees. As shown in Figs. 9, 13, 14 and 28, the master strip A is provided along its opposite side edges with holes h for engagement by a pin roll 162, Figs. 11, 13, 14 and 72, whereof the shaft 163 is suitably journaled in the cross member 161. Affixed to the shaft 163 of pin roll 162, see Figs. 13, 14, 29–33, 35, 36 and 40, is a spur pinion 165 which is in mesh with a spur pinion 166 fast on a shaft 167. Also fast on the shaft 167 is a disk 168 with quadrantly spaced rollers 169 thereon and with correspondingly spaced peripheral notches 170 which are aligned radially with said rollers. Pairs of the rollers 169 normally ride the concentric edge portion of a rotary cam 171 on the shaft 12, said cam having a recession at 171a and a single gear tooth 171b directly inward of and in radial alignment with said depression. In the region of the recession 171a the cam is formed with a segmental groove by a cam projection 172 on a disk 173 of larger diameter which may be integral with the cam 171. By the "Geneva" type arrangement just described, it will be seen that the pin roll 162 is rotated through a quarter turn during each rotation of the cam shaft 12 to advance the master strip A for presentation each time of a new data bearing area thereof at the platen 160. The rotary cam 171 and the disk 173 are freely mounted on the shaft 12 but normally clutched to the disk 175 which, see Figs. 29 and 37, is fixed to said shaft. The clutching is accomplished by a clutch element 176 whereof the shaft 176a is rotatively engaged in the cam 171. At one end the shaft 176a of the clutch element 176 is cut away, see Figs. 29 and 37–39, to provide a semi-circular projection 176b which normally engages into a notch 177 internally of a circumferential flange 175a of the disk 175 as shown in Figs. 30, 34 and 39. Upon slight rotation of the clutch element 176, its projection 176b as withdrawn from the notch 177 in the disk 175 as shown in Figs. 35, 36 and 38 whereby the cam 171 is released from said disk under certain conditions hereinafter set forth. The clutch element 176 is normally maintained in the active position of Figs. 30, 34 and 39 through engagement of an inwardly extending finger 176c thereon by a spring loaded pin 178 (Figs. 30 and 37), constrained to endwise movement in a boss 171c on the cam 171. Diametrically opposite the finger 176c the clutch element 176 has an actuating finger 176d which projects beyond the periphery of the cam 171. The means for actuating the clutch element 176 includes a detent 180 which is freely fulcrumed on a fixed stud 181 and which is yieldingly urged toward the cam by means of the spring 182. Normally, during each rotation of the cam 171, the detent is moved out of the reach of the finger 176d of the clutch element 176 through engagement of a roller 183 thereon by a cam lug 184 on the disk 175 as in Fig. 34. Associated with the detent 180 and fulcrumed for independent movement on the stud 181 is an auxiliary detent 185 which is normally held retracted from the range of the projection of the clutch element by a latch 186 as in Fig. 30 against the pull of a spring 187. Slidably guided in the detent 185 is a headed plunger 188 which is urged outwardly by a spring 189, the outward movement being limited by the stop nut at 190. The latch 186 is fulcrumed on another fixed stud 191 and is biased toward the auxiliary detent 185 by a spring 192, and is arranged to be actuated by a solenoid 179 as later explained in the event of depletion of blank checks at the feeding mechanism. Upon release as in Fig. 34, the auxiliary detent 185 is urged toward the cam 171 into the path of the finger 176d of the clutch element 176, and, upon contact of said finger with the plunger 188 in said detent, the clutch element is turned to the position of Figs. 35 and 38 with the result that the cam is disconnected from the disk 175 and arrested in its rotation. At the moment that this happens, the detent 180 is still held retracted from the cam 171 by the cam lug 184 on the disk 175 as in Fig. 34. As the finger 176d of the clutch element 176 strikes the plunger 188 of the detent 185, said plunger is depressed against the force of the spring 189 which, in subsequently reacting, causes a slight reverse rotary shift of the now disconnected cam 171 by which time the cam lug 184 has passed beyond the detent 180 which thereupon assumes the active position of Fig. 35 to positively lock the cam 171 temporarily against rotation. The extent of reverse rotation allowed the cam 171 as just explained is limited by a spring pressed stop 193 which is arranged to engage a notch 194 in the periphery of said cam. The cam 171 is thus stopped, each time, in a definite position in its rotation. Immediately upon unclutching of the cam 171, the auxiliary detent 185 is restored to its normal retracted position as in Fig. 36 through engagement of a roller 195 thereon by another cam lug 196 on the disk 175, detent 185 being incidentally re-engaged by the latch 186 automatically and so held until said latch is actuated. Referring again to Fig. 11, the shaft 197 of a press roll 198 which cooperates with the platen 160 in effecting the printing, has its ends journalled in bearing blocks 199 engaged in guideways 200 at the ends of a pair of levers 201 keyed to a rock shaft 202. Also keyed to the rock shaft 202 are two arms 203 and 204, the first of which arms carries a roller in running contact with a rotary actuating cam 205 on the shaft 11, and the second of which arms is subject to the downward pull of a helical tension spring 206. During each rotation of the cam 205, the press roll 198 is moved downward in opposition to the force of the spring 206 into operative relation to the platen 160 while a blank check B is temporarily arrested at the printing station. At the same time, the press roll 198 is moved longitudinally of the machine within the limits of the guideways 200 in the levers 201, by the action of another cam 207 on the shaft 11 upon the roller on an arm 208 fixed to another rock shaft 209 together with corresponding upright arms 210 and 211 which, through link rods 212 and 213, are connected to the ends of the shaft of said roll. The cam 205 is freely mounted on the shaft 11 but is normally rotated through coupling thereof with a disk 215 fixed upon said shaft by a clutch element 216 similar to the clutch element previously described in connection with the cam 171 on shaft 12. Here, likewise, a pair of detents 217 and 218 are provided to cooperate in arresting the rotation of the cam under certain circumstances when the latch at 219 is retracted upon energization of the solenoid at 220. Here also, the disk is provided with cam projections 221 and 222 to re-act in a similar manner upon the detents 217 and 218, and a pivoted spring-biased stop 223 is relied upon to restrain the cam upon being suddenly unclutched from the disk.

Stacking mechanism

This mechanism is generally similar to that disclosed in my U. S. Patent No. 2,595,346, granted to me on May 6, 1952. As best shown in Fig. 12, the stacking mechanism S comprises an open receiver 230 which is mounted on top of the framework 2 at the end of the machine opposite to that occupied by the feeding mechanism F. Within the receiver at the bottom is a table 231 onto which the printed checks are shifted from the auxiliary conveyer C' by a pair of normally-retracted pusher arms 232 secured, with a smaller arm 233, on a rock shaft 235. By means of a link rod 236, the arm 233 is connected to one end of a medially fulcrumed lever 237 having at its other end a roller running upon the periphery of a rotary actuating cam 238 on the shaft 10, see Figs. 17, 60–62. Each time that a check is advanced to it, the table 231 is moved upward to add the check to the bottom of a pile of previously stacked checks, said pile being normally sustained from beneath by pivoted fingers 239 and 240 disposed at the back and at the sides of the receiver 230 at the bottom, said fingers being yieldingly urged inwardly of the receiver by springs not shown. Projections, such as the one shown at 241, on the table 231 in acting upon cam slopes 239a on the fingers 239 and similar ones on the fingers 240, thrust said fingers temporarily aside as the table is raised. Up and down movements are imparted to the table 231 from another rotary cam 245, see Fig. 17, affixed to the shaft 10 on the periphery of which cam rides a roller on one arm of a bell crank 246 freely fulcrumed on a fixed axis 247, the other arm of said bell crank being connected through a link rod 248 to said table.

Clutch and brake control mechanism

For a brief description of this mechanism which is generally like that of my co-pending application hereinbefore referred to, reference will be had more particularly to Figs. 12, 17 and 21–24. The clutch 3 associated with the drive pulley 4 is engageable and disengageable by means of a collar 250 slidable on the main shaft 1. The collar 250 is connected to a yoke 251 whereof the shaft 252 is rotatively supported in a fixed bracket 253. For manual shifting of the collar 250, the shaft of the yoke 251 is provided with a hand lever 255. Engaged with capacity for endwise movement in spaced guide posts 256 and 257 are horizontal slide bars 258 and 259 whereof the lower one is connected at one end to the yoke 251. Springs respectively designated 260 and 261 tend to yieldingly urge the bars leftward to the limit imposed by engagement of studs 262 and 263 respectively on said bars with the guide post 257 as in Fig. 23. By means of a link 265, the upper slide bar 258 is connected to the lower end of a lever 266 which is fulcrumed to swing about a fixed stud 267 and which carries a roller 268 that rides the periphery of another rotary cam 269 on the shaft 10. A spring loaded pawl 270 constrained to vertical movement in a guide bracket 271 on the lower slide bar 259 is adapted to engage, at certain times for a purpose hereinafter explained, a notch 258a in the bottom edge of the upper slide bar 258. Affixed to the upper slide bar 258 is a cam plate 272 which, by cooperation with a roller on the pawl 270 serves, at other times, to depress the latter and thereby withdraw it from the notch 258a in said upper bar 258. Fast on a crosswise shaft 273 is a lever 274 and a hand lever 295, the movement of said shaft being limited through cooperation of a finger 275 with a pair of fixed stops 276 and 277 on the bracket 257. By draw of a helical tension spring 278 upon an arm 279 also secured to the shaft 273, the levers 274 and 295 are normally maintained in the positions shown in Figs. 21–24 with the finger 275 engaging the stop 276. Normally, the pawl 270 is held retracted as in Fig. 21 by a latch element pivoted at 280, said latch element being connected by a link 281 to an arm 282 fulcrumed at 283. As shown, the arm 282 has two diametral finger projections 282a and 282b whereof the former extends into the path of a lateral stud projection 284 on the upper slide bar 258, and whereof the latter extends into the path of a lateral stud projection 285 at one end of a lever 286 medially fulcrumed at 287. A roller on the opposite end of the lever 286 runs in contact with another rotary actuating cam 288 on the shaft 10. A stud 289 on the latch element 280 has a slotted connection with one end of a coupling link 290 whereof the opposite end is connected to the armature 291 of a fixedly positioned solenoid 292. The spring toggle means at 293 tends to hold the latch element 280 yieldingly in either of the two positions in which it is shown in Figs. 21 and 22 respectively. Upon automatic disconnection of the clutch 3, as hereinafter described, the brake means indicated at 294 is actuated as the collar on the main shaft 1 is shifted rightward as in Fig. 24.

*Check detector*

This device is comprehensively designated by the numeral 296 in Fig. 11 and illustrated in detail in a larger scale in Figs. 41–43. As shown, it includes a lever 297 which is affixed to a transverse rock shaft 298. Adjustably secured in another lever 297a fixed to shaft 298 is a tappet projection head 299 which, during each dwell period of the main conveyer, is moved toward and away from the bars upon which the blank checks are momentarily arrested in their traverse through the machine. This movement is imparted from a rotary cam 300 on the shaft 12 which acts upon a roller on one arm of a bell crank lever 301 whereof the other arm is coupled, by means of a link rod 302, to an arm 303 secured to the rock shaft 298 with the levers 297 and 297a. The extremity of the lever 297 underreaches the actuating stem 305 of an electric switch 306 which, when closed due to the presence of more than one check beneath the tappet 299, is instrumental in causing energization of the clutch solenoid 290 and instantaneous stopping of the machine in a manner later on explained. While arrested at this detecting station, the checks are held to the bars 95 by L-shaped hold down elements 307 which are secured in spaced relation to the cross shaft 298 and whereof the ends are bifurcated as best seen in Fig. 13.

*Master strip detector mechanism*

For the description of this mechanism, reference will be had to Figs. 11, 13, 14, 28 and 45–49 of the drawings. Fulcrumed on a fixed stud 320 beneath the platen support 160 is a bell crank 321 which, through a roller on one of its arms, is actuated during each rotation of the transverse shaft 12 by a rotary cam 322 affixed to said shaft. The other arm of the bell crank 321 carries a stud 323 which is thrust through an aperture 324 in one of the sloped flanking portions 161b of the platen support to normally engage the master strip A from beneath. In alignment with the aperture 324 is a metallic pad 325 which normally bears on the top surface of the master strip, said pad having its supporting shank 325a secured in the distal end of an arm 326 on a cross shaft 327. From Fig. 47 it will be noted that the stud 323 and the shank of the pad 325 are electrically insulated from the respective arms 321 and 326 in which they are secured, and to them are connected conductor leads 328 and 329. In the event that an error is made in typing or otherwise inscribing the data on any one of the panel areas of the master strip A, the typist punches a hole such as the one indicated at H in Figs. 49 and 72 inward of one of the side edges of the strip. This hole H is so located that, as the master strip is intermittently progressed in the machine, the hole will eventually be brought into registry with the aperture 324 in the platen support 161b. As a consequence, upon the next actuation of the arm 321, the stud 323 will be brought into direct metallic contact with the pad 325 and a circuit closed through the conductors 328 and 329 whereby, through means also later on explained, operation of the check feeding mechanism is prevented during the time that the punched area of the sheet is exposed on the platen 160. A like action will also occur in the event that the master strip A runs out.

In the gap between the platen 160 and the rods 95, see Figs. 11, 13, 28, 45 and 46 the blank checks B are supported by wings 310 on a cross shaft 311 whereto is secured an arm 312, which is connected by a link rod 313 with an arm 314 on the shaft 327 on which the master strip detector arm 326 is fixed. Also affixed to the shaft 311 is a hand crank 315. By turning the hand crank 315 counterclockwise from the position of Fig. 45 to the position of Fig. 46, it will be seen that, through the arrangement just described, the parts are moved out of the way to facilitate insertion and removal of the master sheet A into and from the machine. This operation is of course also attended by retraction of the check detector arm 326 as will be readily understood from Fig. 46.

*Time delay mechanism*

Freely mounted upon a stud shaft 335 (Figs. 11, 13, 14 and 50–54) is a collar 336 having, in integral formation therewith at opposite ends, ratchet wheels 337 and 338. The ratchet wheel 337 is picked a tooth at a time by a pawl 339 on a plate 340 which is oscillated about the shaft 335 by virtue of being connected to the rod 341 of an eccentric 342 affixed to the cam shaft 12. A detent pawl indicated at 343 serves, by cooperation with the teeth of the ratchet wheel 338, to prevent reverse rotation of the collar 336. Circumferentially arranged in the ratchet wheel 338 is a series of slide pins 345 which are adapted to be individually projected at the lower part of said wheel in Fig. 50 by a tappet 346 which is fulcrumed at 347 and connected by a link 348 with the armature 349 of a solenoid 350 when said solenoid is energized. Normally, the pins 345 are maintained in retracted position as at the top of Fig. 50 by a circular bevel-edged cam 351 fixed against rotation upon the stud shaft 335. The pins 345 are yieldingly held either retracted or projected by spring pressed balls 352 disposed in radial bores of the ratchet wheel 338, and adapted to engage into one or the other of two spaced circumferential grooves in said pins. Fixedly positioned on the framework 2 is an electric switch 353 which is closed through movement of its actuating arm 354 as shown in Fig. 54 by the pins 345 when the latter are individually projected as aforesaid. The purpose of this arrangement will also be set forth later herein.

*Check counter*

In the present instance, the machine is provided with an electric check counter 355 which is arranged to be actuated, also as later explained, by closing a switch shown at 356 in Figs. 1, 11, 13 and 14. A roller on the arm 357 of this switch 356 rides the periphery of a rotary actuating cam 358 on the shaft 12. While arrested at the counting station, the checks are held to the bars 96 by hold down fingers 308 secured to the cross shaft 309.

*Electrical control mechanism*

In addition to the electrical instrumentalities already mentioned, this control mechanism include the further elements about to be described:

Secured to the framework 2 at one side of the machine in the region of the blank check detector, as shown in Figs. 11 and 55–59, is a group of three transversely aligned electric switches 360, 361 and 362, and in the region of the counter 355 is a single electric switch 363. The operating arms of the switches 360—362 overreach the universal bar 365a at the distal end of one extremity of a spring-influenced actuating bell crank lever 365 which is freely fulcrumed about a fixed stud 366. The operating arm of the single switch 363 overreaches the extremity of another spring-influenced actuating bell crank 367 which is freely fulcrumed on another fixed stud 368. The bell cranks 365 and 367 are normally maintained in the positions of Fig. 56 by latching engagement with spring-influenced arms 369 and 370, respectively, secured to rock shafts 371 and 372 together with sensing fingers 373 and 374 by which the blank checks are engaged from beneath while temporarily arrested at the detecting and counting stations. In the agsence of checks, the fingers 373 and 374 are moved upward through the bifurcate ends of the L-shaped hold down elements 307 and 308 as shown in Figs. 58 and 59 and as later on explained. Fixed in the pendent extremities of the bell cranks 365 and 367 are pins 375 and 376 which, respectively, are engaged in the slots 377 and 378 of a link rod 379.

The link rod 379 is actuated at each revolution of the shaft 10 during a concurrent incremental shift of the conveyers C and C' by virtue of being connected to one arm of a bell crank 380 which, on its other arm, carries a roller in running engagement with the periphery of another rotary cam 381 on the shaft 10, see Figs. 17, 56 and 57. Fixed upon the link rod 379 are stops 382 and 383 which are adapted to act upon the latching arms 369 and 370 affixed to the shafts 366 and 368 to hold the sensing fingers 373 and 374 positioned as in Fig. 57 and thereby permit the checks to be drawn between them and the hold down elements 307 and 308 during the shifts of the conveyer C' when the roller on the bell crank 380 rides the concentric portion of the rotary cam 381. Further included in the electrical control system are other switches, see Figs. 63, 66, 68 and 69 which, respectively, are designated 385, 386 and 387 and arranged to be actuated respectively, through roller arms 388, 389 and 390, by identically configured and positioned rotary cams 391, 392 and 393 (see Figs. 11, 13, 14 and 63) on the cam shaft 12. Also included is a switch 394 which, see Figs. 60–62, arranged to be actuated by one of the arms 232 whereby the printed checks are transferred from the auxiliary conveyer C' into the stacker S. Electric current for the system is supplied from the mains 395 and 396 of an 110 A. C. power line across which the drive and vacuum pump motors 5 and 24 are directly connected with interposition of hand switches 397 and 398. Also connected across the power mains 395 and 396 is the primary coil of a transformer 399 by which the E. M. F. is stepped down to say 16 volts for use in the various circuits of the system.

*Operation*

In preparation for the operation of the machine, the stack of checks to be printed is placed, upside down, on the table 62 of the feeding means F, and said table adjusted to bring the topmost check to the feeding level in the manner described in my co-pending patent application previously referred to herein. The shaft 311 (Figs. 11 and 45) is next turned counterclockwise by means of the crank handle 315 to effect the retraction of the arm 326 and the wings 310 as in Fig. 46 for access to the platen 160 in inserting the master strip A into the machine. It will be noted from Figs. 45 and 72 that several blank panels or areas a are left at the starting end of the master strip A. In placing the master strip A in the machine, the first data bearing panel area a' is positioned over the flanking slope 161b of the cross member 161 at the location of the detector elements 323 and 325 and the perforations h in the advance portion of the strip engaged with the pins of the roll 163 as in Fig. 45. After threading of the strip A, the hand lever 315 is swing back to the original position of Fig. 45 to restore the parts 310 and 326 into operative relation relative to the platen 160. The manual switches 397 and 398 (Fig. 63) are thereupon closed to start the main drive motor 5 and the vacuum pump motor 24. It is to be understood that the clutch 3 (Fig. 24) is disconnected at this time and that the pulley 4 will therefore rotate idly about the main shaft 1. All being now in readiness, the hand lever 295 is momentarily raised by the machine attendant, from the position in which it is shown in Fig. 24, whereby the finger 274 is swung downward to depress the pawl 270 carried by the slide bar 259 and so withdraw said pawl from the notch 258a in the slide bar 258 as in Fig. 21. After being depressed as just explained, the pawl 270 is caught by the latch 280 as in Fig. 21, and so held during normal functioning of the machine. Due to release of the slide bar 258, the machine attendant is enabled to shift the collar 250 along the main shaft 1 by means of the hand lever 255 and thereby engage the clutch 3 for communication of rotary motion to said shaft from the pulley 4. Through the worm gear couples 6, 8 and 7, 9, the transverse cam shafts 10 and 11 are thereafter driven in unison and at the same speed in the direction of the arrows in Figs. 11 and 12, and the shaft 12 driven in the same direction and at the same speed with the shaft 11 through the connecting spur gear train 13, 14, 15, said shafts all turning through a complete rotation for each printing cycle of the machine.

In the normal operation of the machine, the blank checks B are successively taken by the suction feed element 20 (Fig. 10) and presented to the grippers 76 on the main conveyer C. In being subsequently drawn between the rolls 146, 147 of the moistening means M, as in Fig. 1, enroute to the printing means P, the faces of the invertedly positioned checks B are moistened with solvent. During each advance increment of the conveyer C, the pin roller 162 of the printing mechanism P is turned through its connections with the rotary cam 171 on the cam shaft 12 for presentation of a new panel area a' of the master sheet A at the platen 160, the shift of the master sheet being in a direction contrary to that of the lower run of the conveyer C and occurring while the press roll 198 is retracted relative to said platen 160. Upon arrival of the first blank check B at the printing mechanism P, the first data bearing panel area a' will have been advanced into position over the platen 160, and during the current dwell of the conveyer C, the arm 203 is actuated by the rotary cam 205 on the shaft 11, the press roll 198 being thereby lowered as in Figs. 2 and 11 into contact with the arrested check B, whereupon said roll is moved horizontally over the arrested check in the direction of the lower run of conveyer C by action of the cam 205 upon the arm 208 during the current rotation of said shaft 11. In this way, the inscribed data is transferred from the master sheet A to the moistened face of the temporarily arrested check B. After traversing the printing mechanism P, each newly printed check B' is advanced to the counter 355 and registered thereby, while another previously printed check is advanced over the auxiliary conveyer C' to a position in readiness to be engaged from the rear by a pair of the pusher lugs 128 on said auxiliary conveyer. Just as a printed check B' reaches the last mentioned position, the grippers 76 which held it up to this stage are opened by action of the cam fingers 130, whereupon the hold down fingers 131 are retracted by action of the rotary cam 137 on the shaft 10 upon the roller arm 136 which, by means of the link 134 and arm 135 is connected to said hold down. During the instant rotation of the shaft 10, the conveyers C and C' are concurrently shifted, in a manner already understood, incident to which a printed check B' is advanced to the stacker S and finally shifted onto the table 231 of said stacker by the pusher 232 which is operated, through actuation of the arm 237 by the rotary cam 238 on the shaft 10. Upon placement of each printed check B' in the stacker S, the table 231 of the latter is elevated in the manner hereinbefore explained, and the check is added to the bottom of the pile of previously printed checks already in said stacker. The checks are thus piled in the stacker S in the same order in which they were originally placed in the feeding mechanism.

During each actuation of the conveyers C and C', the check detector arm 297a and the master strip detector arm 321 are retracted so as not to interfere with the progression of the checks B' and of the master strip A in the machine, the check detector arm being retracted as a result of the action of the cam 300 on the shaft 12 upon the arm 301 (Fig. 41), and the master strip detector arm 321 being retracted by the action of the cam 322 (Fig. 48) on the arm 321. As long as single blank checks are presented beneath detector arm 297a, and unpunched panel areas of the master strip A are presented at the platen 160, the machine will therefore function in the normal manner.

Upon arrival of a punched panel area of the master strip A at the detecting station and registry of the hole H herein with the aperture 324 in the portion 161b of the cross member 161, direct metallic contact will be made between the stud 323 on the detector arm 321 and the pad 325 on the arm 326, as in Figs. 3, 49 and 64, as said arm 321 is moved counterclockwise by its spring incident to passage, beneath the roller on the latter arm, of the depression in the rotary cam 322 on the shaft 12. This will occur while the switch 386 is closed, as in Fig. 64, through actuation of its arm 389 by the rotary cam 392. Under these circumstances, a circuit will be established from the secondary of the transformer 399 by way of the conductors 400, 401, 402, 403, 328, detector contacts 323, 325, conductor 329, closed switch 386 and conductors 404, 405, 406, 407 and 408 through the coils of the solenoids 350 and 71. By energization of the solenoid 71, the link 70 is drawn rightward in Fig. 10 to trip the latch 69 for release of the detent 66 and forcing of the latter by its spring, into locking engagement with the notch 28a in the end clevis of the link 28 as in Fig. 26, so that the relief valve 26 is held open to break the vacuum and thereby prevent feeding of a blank check to the conveyer C at this time notwithstanding actuation of the feeding element 20. By energization of the solenoid 350 as above explained, the finger 346 of the time delay mechanism is actuated through the link 348, as in Fig. 50, to project the stud 345a in registry therewith at the time, from the ratchet wheel 338. By the time the punched panel area a' of the master sheet A arrives at the platen 160, the ratchet wheel 336 of the time delay mechanism will have been picked from the position of Figs. 52 and 64, through the position of Fig. 53, to the position in which it is shown in Figs. 54 and 65, with consequent opening of the switch 353 and breaking of the circuit 400, 409, 410, 422, 423, closed switch 361, and conductors 424, 425, 413, 414, 405 and 406 to prevent retraction of the latch 186 and release of the detent 185. However, the solenoid 220 will be energized at this time due to establishment of the circuit from the secondary of the transformer 399 by way of the conductors 400, 409, 411, 412, closed switch 360, and conductors 421, 413, 414, 405 and 406. Energization of the solenoid 220 is attended by retraction of the latch 219 and release of the detent 218 for actuation of the clutch means, hereinbefore referred to whereby the cam 205 (Fig. 11) is normally clutched to the shaft 11, so that said cam is disconnected from said shaft during the current rotation of the latter. Since the switch 353 is open, the solenoid 292 will not be energized at this time, and the machine will therefore continue in operation. In this way, actuation of the press roll 198 of the printing mechanism P is prevented while the punched panel area a' of the master strip A is arrested on the platen in absence of a check over said area.

In the event of presentation at the detecting station of two or more blank checks B stuck together as in Figs. 6, 41 and 66, the switch 306 will be closed during dwell of the conveyer C at the moment when the switch 385 is closed by action of the rotary cam 391 upon the arm 388. Thus, in this contingency, a circuit is established as shown in Fig. 66, from the secondary of the transformer 399 by way of the conductors 400, 415, coil of solenoid 292, conductors 416, 417, 418, closed switch 385, conductor 419, closed switch 306 and conductors 420, 413, 414, 405 and 406. By energization of the solenoid 292 and attendant pull upon the link 290 as in Fig. 24, the pivoted latch 280 is retracted to release the pawl 270 which is forced upward by its spring into engagement with the notch 258a in the slide bar 258. As the slide bar 258 is shifted to the right by action of the high lobe 269a of cam 269 during the current rotation of the shaft 10, the bar 259 is moved along with said bar 258 and imparts counterclockwise movement to the yoke 251 whereby the collar 250 on the main shaft 1 is shifted to disengage the clutch 3 and to effect, at the same time, the application of the brake to arrest rotation of said main shaft and thereby bring about instantaneous stopping of the machine.

Upon complete exhaustion of the supply of the blank checks B and passage of the last check beyond the detecting station as in Fig. 7, sensing fingers 373 will swing upward again as in Fig. 58 with attendant closing of the switches 360, 361 and 362 as in Fig. 67. Current flow will there upon take place from the secondary of the transformer 399 by way of the conductors 400, 409, 410, coil of solenoid 179, conductors 422, 423, closed switch 361, conductor 424, closed switch 353, conductors 425, 413, 414, 405 and 406. Current flow will also take place through the coil of the solenoid 220 by way of the conductors 400, 409, 411, 412, closed switch 360, conductors 421, 413, 414, 405 and 406. In addition, a circuit will be established through the coil of solenoid 292 by way of the conductors 400, 415, 416, 426, closed switch 362, conductors 427, 423, closed switch 361, conductor 424, closed switch 353, and conductors 425, 413, 414, 405 and 406. By energization of the solenoids 179 and 220, the latches 186 and 219 are retracted to release the detents 185 and 218 whereby the cams 171 and 205 will be unclutched from the respective shafts 11 and 12 in a manner already understood to prevent further progression of the master strip A and operation of the press roll 198 of the printing mechanism P; while due to the energization of the solenoid 292, the clutch 3 will be withdrawn and the machine stopped, likewise in a manner already understood.

Upon running out of the master strip A, the detector elements 323 and 325 will contact, as in Fig. 64, and so remain and the solenoid thus kept energized to prevent further feeding of blank checks B to the conveyer C. Then, after the last blank check has passed the detecting station, the sensing fingers 373 will swing up to the position of Fig. 58 and the machine will be automatically stopped in the manner previously described in connection with Fig. 67.

In the event that a printed check would become crushed and jammed at the stacker S as in Figs. 8 and 62 and thereby prevent opening of the switch 394 by the corresponding pusher arm 232a at the moment that the switch 387 is held closed as in Fig. 68, the solenoid 292 is energized to retract the clutch 3 in the same manner as previously described to stop the machine. In this case, current flow from the secondary of the transformer 399 takes place through the conductors 400, 415, 416, 417, 435, closed switch 387, conductor 436, closed switch 394, and conductors 437, 406.

The counter 355 will not operate unless a check is passed, as shown in Figs. 56 and 69 between the sensing fingers 374 and the hold down elements 308. In the absence of a check at any time, the sensing fingers 374 will swing up as in Fig. 59 with incidental opening of the switch 363 during the moment that the switch 356 is held closed by action of the cam 358 upon the arm 357. Under this condition, the circuit 430, 431, 432 and 433 will be broken and hence prevent actuation of the counter 355 as will be readily understood from Figs. 56 and 69.

Having thus described my invention, I claim:

1. In a duplicating machine, an intermittently-actuated conveyer; feeding means for feeding blank sheets successively to the conveyer; a stationary platen; progressing means for intermittently advancing a master strip for successive presentation, at the platen, areas of the strip bearing data inscribed thereon in copying ink; means for pressing the individual sheets successively advanced over the platen against the areas of the master strip to receive impressions of the data; a revolving shaft and interposed connections through which the conveyer, the feeding means and the master strip advancing means are actuated; a normally-engaged clutch by which the shaft is connected to a power means; a solenoid for actuating the clutch; a detecting means including a normally-retracted contact element; means for moving the contact element into engagement with one side of the master strip during the dwells of the latter on the platen; an opposing contact element normally engaging the opposite side of the master strip, said contact elements being in circuit with the solenoid whereby, upon running out of the master strip and direct contact between said elements, the circuit is closed and the solenoid is energized to retract the clutch and stop the machine.

2. The invention according to claim 1, wherein the platen is provided with an aperture which is overtravelled by the master strip; wherein one of the contact elements is in the form of a finger which, during the rest periods of the strip, is adapted to enter the aperture in the platen and engage the strip from beneath; and wherein the opposing element engages the strip from above.

3. In a duplicating machine, an intermittently-actuated conveyer; feeding means for feeding blank sheets successively to the conveyer; a stationary platen; progressing means for intermittently advancing a master strip for successive presentation, at the platen, areas of the strip bearing data inscribed thereon in copying ink, said strip having punch holes respectively in areas thereof bearing incorrectly inscribed data; means for pressing the individual sheets successively advanced over the platen by the conveyer against the presented areas of the master sheet to receive impressions of the data therefrom; detecting means including a normally-retracted finger; means for moving the finger into an aperture in the platen and engaging the strip from beneath during the dwells of the latter on the platen, and an opposing element for engaging the strip from above; and connections between the detector finger and the feeding means whereby, through direct contact of the finger with the opposing element upon registry of one of the punch holes in the master strip with the aperture in the platen, the feeding means is temporarily prevented from feeding a blank sheet to the conveyer.

4. In a duplicating machine, an intermittently-actuated conveyer; feeding means for feeding blank sheets successively to the conveyer; a stationary platen and a support therefor; progressing means for intermittently advancing a master strip for successive presentation at the platen, areas of the strip bearing data inscribed thereon in copying ink, said strip having punch holes respectively in areas thereof bearing incorrectly inscribed data; means for pressing the individual sheets, successively advanced over the platen by the conveyer, against the presented areas of the master sheet to receive impressions of the data therefrom; a detecting means including a normally-retracted contact finger; means for moving the finger into an aperture in the platen and engaging the strip from beneath during the dwells of the latter on the platen, and an opposing contact element for engaging the strip from above; and electrical connections between the detecting means and the feeding means whereby, through direct contact of the finger with the opposing element, upon registry of one of the punch holes in the master strip with the aperture in the platen support, the feeding means is prevented from feeding a blank sheet to the conveyer.

5. In a duplicating machine, an intermittently-actuated conveyer; feeding means including a suction element and means for intermittently actuating it to feed blank sheets successively from a supply to the conveyer; a stationary platen and a support therefor; means for intermittently advancing a master strip for successive presentation at the platen areas of the strip bearing data inscribed thereon in copying ink, said strip having punch holes respectively in the areas thereof bearing incorrectly inscribed data; means for pressing the individual sheets, successively advanced over the platen by the conveyer, against the presented areas of the master sheet to receive impressions of the data therefrom; detecting means including a normally-retracted contact finger means for moving the finger into an aperture in the platen support and for engaging the strip from beneath during the dwells of the latter on the platen, and an opposing contact element for normally engaging the strip from above; and electrical connections between the detecting means and the feeding means whereby, through direct contact of the finger with the opposing element, upon registry of one of the punch holes in the master sheet with the aperture in the platen, the vacuum to the suction element of the feeding means is temporarily cut off to prevent feeding of a blank sheet to the conveyer.

6. In a duplicating machine, an intermittently-actuated horizontally-arranged conveyer; feeding means for feeding blank sheets successively to the conveyer; a stationary platen and a support therefor spaced from the feeding means by a distance corresponding to several shifts of the conveyer; means for intermittently advancing a master strip for successive presentation, at the platen, areas of the strip bearing data inscribed thereon in copying ink, said strip having punch holes respectively in areas thereof bearing incorrectly inscribed data; normally-retracted press element for pressing the individual sheets, successively advanced into position over the platen by the conveyer, against the successively presented areas of the master sheet to receive impressions of the data therefrom; means for actuating the press element; time delay means; detecting means including a normally-retracted finger; means for moving the finger into an aperture in the platen support in advance of the platen, as considered with respect to the direction of progression of the master sheet, and to engage the master sheet from beneath while arrested on the platen, and an opposing element for engaging the master sheet from above; connections between the detecting means and the feeding means whereby, through direct contact of the finger with the opposing element, upon registry of one of the punch holes in the master strip with the aperture in the platen support, the feeding means is prevented from feeding a blank sheet to the conveyer, and whereby the time delay means is set to function; and connections controlled by the time delay means for rendering the actuating means for the press element inoperative temporarily upon arrival of the portion of the conveyer, not fed with a blank sheet as aforesaid, and the punched area of the master strip at the platen.

7. In a duplicating machine, an intermittently-actuated horizontally-arranged conveyer; feeding means for feeding blank sheets successively to the conveyer; a stationary platen and a support therefor spaced from the feeding means by a distance corresponding to several shifts of the conveyer; means for intermittently advancing a master strip for successive presentation, at the platen, areas of the strip bearing data inscribed thereon in copying ink, said strip having punch holes respectively in areas thereof bearing incorrectly inscribed data; a normally-retracted press element for pressing the individual sheets, successively advanced into position over the platen by the conveyer, against the successively presented areas of the master sheet to receive impressions of the data therefrom; means for actuating the press element; time delay means; detecting means including a normally-retracted contact finger means for moving the finger into an aperture in the platen support in advance of the platen, as considered with respect to the direction of progression of the master sheet, and to normally engage the master opposing contact element normally engaging the master sheet from above; electrical connections between the detecting means and the feeding means whereby, through direct contact of the finger with the opposing contact element, upon registry of one of the punch holes in the master strip with the aperture in the platen support, the feeding means is prevented from feeding a blank sheet to the conveyer, and whereby the time delay means is set to function; and other electric means controlled by the time delay means for rendering the press element actuating means inoperative upon arrival of the portion of the conveyer, not fed with a blank sheet as aforesaid, and the punched area of the master strip at the platen.

8. In a duplicating machine having a stationary platen, means for intermittently advancing a master strip for presentation of data, serially inscribed thereon with copying ink, at the platen, and intermittent means operative at each actuation to advance a blank sheet from a supply to position over the area of the master strip arrested on the platen: press means including a press roll; a pair of levers having slots at their distal ends in which journals at the opposite ends of the press roll are slidingly engaged; means for actuating the levers to move the press roll downward from a normal elevated position to press an arrested sheet against the exposed portion of the master strip on the platen; and means for thereafter moving the press roll back and forth in the slots of the levers for impartation of the data from the master strip to the arrested sheet.

9. In a duplicating machine having a stationary platen, means for intermittently advancing a master strip for presentation of data, serially inscribed thereon with copying ink, at the platen, and intermittent means operative at each actuation to advance a blank sheet from a supply to position over the area of the master strip arrested on the platen: press means including a press roll; a rock shaft; a pair of levers on the rock shaft having slots at their distal ends in which journals at opposite ends of the press roll are slidingly engaged; a rotary shaft having a cam thereon; a cam follower arm through which the rock shaft is oscillated to lower and raise the press roll; a second cam on the rotary shaft; a second rock shaft having a follower arm thereon cooperative with the second cam; and a pair of arms on the second rock shaft connected to the press roll journals for moving said journals back and forth in the slots of the levers.

10. In a duplicating machine, a stationary platen and a support therefor, means for intermittently advancing a master strip for successive presentation of data, serially inscribed thereon in copying ink, at the platen, said strip having punch holes respectively in areas thereof bearing incorrectly inscribed data, and intermittent means operative at each actuation to advance a blank sheet from a supply to position over the portion of the master strip arrested at the platen, press mechanism comprising a normally elevated press roll, means for actuating the press roll including a rock shaft, a pair of levers having slots at their distal ends, end bearings for the press roll slidable in the slots of said levers, a rotary shaft with a cam thereon, a follower arm through which the rock shaft is oscillated to lower and raise the press roll, a second cam on the rotary shaft, a second rock shaft having a follower arm thereon, a pair of arms also on the second rock shaft connected to the press roll bearings for moving the roll while lowered and maintained in engagement with the sheet, in one direction along the slots in the levers, and for moving it in the opposite direction upon being elevated subsequently, and normally-engaged clutch means connecting the cams to the rotary shaft; detector means including a finger adapted to enter an aperture in the platen support and engage the master strip from beneath, and an opposing element for engaging the master strip from above; and means automatically operated through the detecting means, upon registry of a punch hole in the master strip with the aperture in the platen support and direct contact of the finger with the opposing element, for actuating the clutch means to disconnect the cams from the rotary shaft and thereby prevent operation of the press roll-actuating means.

11. In a duplicating machine, having a stationary platen and a support therefor, means for intermittently advancing a master strip for successive presentation of data, serially inscribed thereon in copying ink, at the platen, said strip having punch holes respectively in areas thereof bearing incorrectly-inscribed data, end intermittent means operative, at each actuation, to advance a blank sheet from a supply to position over the portion of the master strip arrested at the platen: press mechanism comprising a normally elevated press roll, means for actuating the press roll including a rock shaft, a pair of levers having slots at their distal ends, end bearings for the press roll slidable in the slots of said levers, a rotary shaft with a cam thereon, a follower arm through which the rock shaft is oscillated to lower and raise the press roll, a second cam on the rotary shaft, a second rock shaft having a follower arm thereon, a pair of arms on the second rock shaft connected to the press roll bearings for moving the roll while lowered and in contact with the sheet, in one direction along the slots in the levers, and for moving it in the opposite direction along the slots while elevated, and normally-engaged clutch means connecting the cams to the rotary shaft; detector means including a finger adapted to enter an aperture in the platen support and engage the master strip from beneath, and an opposing element for engaging the master strip from above; a solenoid and interposed instrumentalities for actuating the clutch; and an electric circuit in which the detecting elements and the solenoid are interposed whereby, upon registry of a punch hole in the master strip with the aperture in the platen support and direct contact between the two elements of the detector means, the circuit is closed and the solenoid energized to effect disconnection of the clutch.

12. A duplicating machine according to claim 8 wherein the master strip advancing means comprises a roll with pins for engaging perforations adjacent the side edges of the master strip, a revolving shaft, and interposed gearing whereby the pin roll is turned a definite amount during each revolution of the shaft to present a new data bearing area of the master sheet each time at the platen.

13. In a duplicating machine, an intermittently-actuated horizontally-arranged conveyer; feeding means for feeding blank sheets successively from a supply to the conveyer; a stationary platen; progressing means for intermittently advancing a master strip for successive presentation of data, serially inscribed thereon in copying ink, at the platen, said progressing means including a roll having pins for engaging holes along the side edges of the master strip; a revolving shaft, interposed gearing whereby the pin roll is turned a definite amount during each rotation of the shaft to present a new data bearing area of the master sheet each time at the platen, clutch means normally connecting the cam to said rotary shaft, and a solenoid for actuating the clutch means; press means for pressing the individual sheets, successively advanced by the conveyer over the platen, against the successively presented areas of the master strip to receive imprints of the data, said press means including a normally elevated roller, a rock shaft with a pair of levers thereon having slots at their distal ends, end bearings for the press roll slidable in the slots of the levers, a rotary shaft with a cam thereon, a cam follower arm through which the rock shaft is oscillated to lower and raise the press roll, a second cam on the rotary shaft, a second rotary shaft having a cam follower arm thereon, a pair of arms also on the second rock shaft connected to the press roll bearings for moving said bearings back and forth in the slots of the arms aforesaid; clutch means connecting the last two mentioned cams to the second rotary shaft, and a solenoid for actuating said clutch means; means at a detecting station located between the feeding means and the platen for sensing the presence of the blank sheets during the dwell periods of the conveyer; a switch in circuit with the solenoids and actuated by the sensing means upon exhaustion of the supply of the blank sheets and passage of the last sheet to the platen, to close the circuit whereby both solenoids are energized to actuate the corresponding clutches and so stop operation of the master strip progressing means and the press roller actuating means.

14. In a duplicating machine, an intermittently-actuated conveyer; a feeding means for successively feeding blank sheets to the conveyer; a fixed platen; means for intermittently advancing a master strip for successive presentation of data, serially inscribed thereon with copying ink, at the platen, said means including a roller with pins for engaging holes along the side edges of the master strip, a rotary shaft with a cam thereon, and intermediate connections actuated from the cam to turn the pin roll a definite amount during each rotation of the shaft for presentation, each time, of a new area of the master sheet at the platen; press means for pressing the sheets successively advanced by the conveyer against the areas of the master strip successively presented at the platen; a disk affixed to the rotary shaft alongside the cam; a spring-biased clutch element by which the cam is normally clutched to the disk, said clutch element being carried by the cam with capacity for limited turning movement to unclutching position about an eccentrically-disposed axis, and having a finger normally projecting beyond the periphery of the cam; a normally-retracted detent pivoted on a fixed axis adjacent the cam; a latch for normally holding the detent retracted against spring action; and means automatically operative, upon failure of the conveyer to present a sheet at the platen, to retract the latch for release of the detent to the action of its spring and movement thereof toward the cam into the path of the finger of the clutch element whereby the latter is turned and the cam disconnected from the disk, to prevent advancing of the master strip during the current revolution of the rotary shaft.

15. The invention according to claim 14, further including means for sensing the presence of the sheets upon being fed to the conveyer; a solenoid for retracting the detent restraining latch; and a switch in circuit with the solenoid adapted, in the absence of a sheet of the platen, to be actuated by the sensing means to close the circuit for energization of the solenoid and retraction of the latch.

16. The invention according to claim 14, wherein the detent is provided with a spring-pressed plunger adapted to be directly engaged by the finger of the clutch element and to absorb the shock of impact, and further including a second detent fulcrumed on the same axis with the first mentioned detent and urged toward the cam by a spring; and means for actuating the second detent and holding it temporarily retracted until the first detent has moved into active position, and then releasing said second detent to be engaged by the finger of the clutch element upon slight reverse movement of the cam incident to spring reaction of the plunger on the first detent.

17. The invention according to claim 16, wherein the actuating means for the second detent is in the form of a peripheral cam projection on the disk.

18. The invention according to claim 16, further including means automatically operative during the next rotation of the cam shaft, to move the first detent back to its normal retracted position for re-engagement by the latch.

19. In a duplicating machine, a stationary platen; means for intermittently advancing a master strip for successive presentation of data, serially inscribed thereon with copying ink, at the platen; an intermittently-actuated conveyer for advancing blank sheets successively from a supply to position over the areas of the master strip successively arrested at the platen; a press roll; means operative, at each actuation, to bodily move the press roll downward from a normally elevated position to press an arrested sheet on the conveyer against the exposed area of the master sheet on the platen, then horizontally over the sheet for transfer to the latter of the data from said area, then upward out of contact with the sheet, and finally horizontally in the opposite direction back to its normal position, the last mentioned means comprising a rock shaft, a pair of levers on the rock shaft having slots in their distal ends, bearings for the press roll slidable in the slots of said levers, a rotary shaft with a follower arm thereon through which the rock shaft is oscillated to lower and raise the press roll, a second rock shaft having a follower arm thereon, and a pair of arms on the second rock shaft connected to the press roll bearings for moving said bearings back and forth in the slots of the levers aforesaid; a disk affixed to the rotary shaft alongside the cams; a spring-biased clutch element by which the cams are normally clutched to the disk, said clutch element being carried by the cams with capacity for limited turning movement to unclutching position about an eccentrically-disposed axis, and having a finger normally projecting beyond the periphery of the cam; a normally-retracted detent pivoted on a fixed axis adjacent the cam; a latch for normally holding the detent retracted against spring action; and means automatically operative, upon failure of the conveyer to present a sheet at the platen, to retract the latch for release of the detent to the action of its spring for movement thereof toward the cam into the path of the finger of the clutch element whereby the latter is turned and the cams are disconnected from the disk to prevent actuation of the press roll during the current revolution of the rotary shaft.

20. The invention according to claim 19, further including means for sensing the presence of the sheets upon being fed to the conveyer; a solenoid for actuating the detent restraining latch; and a switch in circuit with the solenoid adapted to be actuated by the sensing means in the absence of a sheet at the platen to close the circuit for energization of the solenoid and retraction of the latch.

21. The invention according to claim 19, wherein the detent is provided with a spring-pressed plunger adapted to be directly engaged by the finger of the clutch element and to absorb the shock of impact, and further including a second detent fulcrumed on the same axis with the first detent and urged toward the cams by a spring; and means for actuating the second detent and holding it temporarily retracted until the first detent has moved into active position, and then releasing said second detent for engagement by the finger of the clutch element upon slight reverse movement of the cams incident to spring reaction of the plunger on the first detent.

22. The invention according to claim 21, wherein the actuating means for the second detent is in the form of a peripheral cam projection on the disk.

23. The invention according to claim 21, further including means automatically operative during the next rotation of the cam shaft, to move the first detent back to its normal retracted position for re-engagement by the latch.

24. In a duplicating machine, an intermittently-actuated conveyer; feeding means for feeding blank sheets successively to the conveyer; printing means for impressing data upon individual sheets advanced thereto by the conveyer; a stacker; a yieldingly-restrained intermittently-actuated element for transferring the printed sheets successively to the stacker from the conveyer; mechanism by which the conveyer, the feeding means, the printing means and the transfer element are actuated, said mechanism including a rotary shaft, and a normally engaged clutch by which said shaft is connected to a power means; a normally closed switch opened by the transfer element at the end of the active movement of the latter; a normally open switch momentarily closed when the first mentioned switch is opened as aforesaid; and a solenoid for actuating the clutch, in circuit with the aforesaid switches whereby, upon crushing of a sheet incident to being displaced from the conveyer toward the stacker the transfer element is caused to yield and thereby prevented from completing its forward movement and opening the first mentioned switch, the circuit is established, with consequent energization of the solenoid and actuation of the clutch to stop the machine.

25. In a duplicating machine, an intermittently-actuated horizontally-arranged conveyer; feeding means for feeding blank sheets successively to the conveyer; printing means beyond the feeding means, as considered with regard to the direction of conveyer travel, for printing data upon the individual sheets advanced thereto by the conveyer; a stacker beyond the printing means for receiving the printed sheets advanced thereto by the conveyer from the printing means; an electrically-actuated counter located between the printing means and the stacker; means for sensing the presence of the individual sheets on the conveyer enroute to the counter; a switch electrically connected to the counter and means for momentarily closing it each time a sheet is presented at the sensing means; and another switch normally closed by the sensing means upon presentation of a sheet thereto; and a circuit in which the two switches are interposed whereby, in the absence of a sheet at the sensing means, the first mentioned switch is allowed to remain open to prevent actuation of the counter.

26. In a duplicating machine an intermittently-actuated conveyer with spaced grippers, a stationary platen along the path of the conveyer, means for intermittently advancing a master strip to present different areas bearing data inscribed thereon with copying ink successively at the platen, and intermittently-actuated means for pressing sheets successively advanced by the conveyer against the data bearing areas of the strip while arrested at the platen; feeding means comprising an intermittently-actuated suction element for removing individual sheets to be printed from the top of a supply pile and presenting them to the successively advanced grippers on the conveyer; a conduit connecting the suction element to a suction source; valve in the conduit; means normally operative to open the valve for suction relief and release of the sheets upon individual presentation to the grippers on the conveyer; a normally-retracted latch element adapted to lock the relief valve in open position; a solenoid for actuating the latch element; a detector switch for sensing the presence of the master sheet at the platen; and an electric circuit in which the solenoid and the detector switch are interposed, whereby, upon running out of the master strip and closing of the detector switch, the solenoid is energized to retract the latch so that the relief valve is held open to prevent further feeding of sheets to the conveyer.

27. In a duplicating machine, an intermittently-actuated horizontally-arranged coveyer; means for feeding individual blank sheets successively to the conveyer; printing means for impressing data upon the individual sheets successively advanced thereto by the conveyer; a support for the sheets located between the feeding means and the printing means; a revolving shaft from which the feeding means and the conveyer are actuated; a normally engaged clutch by which the shaft is connected to a power means; a solenoid and interposed means for actuating the clutch; a normally retracted detector element in the form of a pivoted finger; means deriving its movement from the revolving shaft for moving the detector finger to sense the presence of individual sheets while they are temporarily arrested on the support; a normally open switch in circuit with the solenoid adapted to be closed by a tail projection on the detector finger upon presentation of two or more stuck together sheets at a time to said finger and thereby establish the circuit through the solenoid for energization of the latter and retraction of the clutch to stop the machine.

28. In a duplicating machine, an intermittently-actuated conveyer; feeding means for feeding blank sheets successively to the conveyer; a stationary platen; progressing means for intermittently advancing a master strip for successive presentation, at the platen, areas of the strip bearing data inscribed thereon in copying ink; means for pressing the individual sheets successively advanced over the platen against areas of the master strip to receive impressions of the data; a rotary shaft and interposed connections through which the conveyer, the feeding means and the master strip advancing means are actuated; a normally engaged clutch by which the shaft is connected to a power means; a solenoid for actuating the clutch; and a switch in circuit with the solenoid normally held open by a detector element bearing on the portion of the master strip overlying the platen and operative in the event that the strip runs out to close the circuit for actuation of the clutch to stop the machine.

29. In a duplicating machine, an intermittently-actuated conveyer; feeding means for feeding blank sheets successively to the conveyer; a stationary platen; progressing means for intermittently advancing a master strip for successive presentation, at the platen, areas of the strip bearing data inscribed thereon in copying ink; means for pressing the individual sheets successively advanced over the platen against areas of the master strip to receive impressions of the data; a rotary shaft and interposed connections through which the conveyer, the feeding means and the master strip advancing means are actuated; a normally engaged clutch by which the shaft is connected to a power means; a solenoid for actuating the clutch; a switch in circuit with the solenoid normally held open by a detector element bearing on the portion of the master strip overlying the platen and operative in the event that the strip runs out to close the circuit for actuation of the clutch to stop the machine; a second switch also in circuit with the solenoid held open by a detector element bearing upon the individual sheets and operative in the absence of a sheet on the conveyer to close the second switch and establish the circuit for actuation of the solenoid to stop the machine.

30. In a duplicating machine, an intermittently-actuated conveyer; feeding means for feeding blank sheets successively to the conveyer; a stationary platen; progressing means for intermittently advancing a master strip for successive presentation, at the platen, areas of the strip bearing data inscribed thereon in copying ink; means for pressing the individual sheets successively advanced over the platen against areas of the master strip to receive impressions of the data; a support for the sheets located between the sheet feeding means and the printing means, a stacker; an intermittently actuated element for transferring the printed sheets successively into the stacker from the conveyer; a rotary shaft and interposed connections through which the conveyer; the feeding means, the master strip advancing means and the intermittently actuated element of the stacker derive their motion; a normally engaged clutch by which the shaft is connected to a power means; a solenoid for actuating the clutch; a switch in circuit with the solenoid normally held open by a detector element bearing on the portion of the master strip overlying the platen and operative in the event that the strip runs out to close the circuit for actuation of the clutch to stop the machine; a second switch also in circuit with the solenoid held open by a detector element for contacting the individual sheets while temporarily arrested on the support and operative in the absence of a sheet on the conveyer to close the second switch thereby to establish the circuit for actuation of the clutch to stop the machine; and a third switch automatically operated upon arrest of the transfer element at the stacker by a jammed sheet to close the circuit for actuation of the clutch to stop the machine.

References Cited in the file of this patent

UNITED STATES PATENTS

| | | |
|---|---|---|
| 720,213 | Agnew | Feb. 10, 1903 |
| 1,254,666 | Ekvall | Jan. 29, 1918 |
| 1,359,442 | Soderlund | Nov. 16, 1920 |
| 1,662,194 | Lawson | Mar. 13, 1928 |
| 1,968,166 | Pythian et al. | July 31, 1934 |
| 2,206,841 | Horton | July 2, 1940 |
| 2,258,880 | Bobst | Oct. 14, 1941 |
| 2,282,737 | Mills | May 12, 1942 |
| 2,406,040 | Ryan et al. | Aug. 20, 1946 |
| 2,432,133 | Babicz | Dec. 9, 1947 |
| 2,539,382 | Davidson | Jan. 30, 1951 |
| 2,589,789 | Ford | Mar. 18, 1952 |
| 2,635,538 | Skow | Apr. 21, 1953 |